United States Patent [19]

Terada et al.

[11] Patent Number: 4,833,605
[45] Date of Patent: May 23, 1989

[54] CASCADED INFORMATION PROCESSING MODULE HAVING OPERATION UNIT, PARALLEL PORT, AND SERIAL PORT FOR CONCURRENT DATA TRANSFER AND DATA PROCESSING

[75] Inventors: Hiroaki Terada, Osaka; Katsuhiko Asada, Hyogo; Hiroaki Nishikawa, Osaka; Kenji Shima, Hyogo; Shinji Komori, Hyogo; Mitsuo Meichi, Hyogo; Masahisa Shimizu, Osaka; Soichi Miyata, Nara; Hajime Asano, Osaka, all of Japan

[73] Assignees: Mitsubishi Denki Kabushiki Kaisha, Tokyo; Sharp Corporation, Osaka; Matsushita Electric Industrial Co., Ltd., Osaka; Sanyo Electric Co., Ltd., Osaka, all of Japan

[21] Appl. No.: 765,970

[22] Filed: Aug. 15, 1985

[30] Foreign Application Priority Data

Aug. 16, 1984 [JP] Japan .................................. 59-172109
Nov. 20, 1984 [JP] Japan .................................. 59-247501

[51] Int. Cl.[4] ...................... G06F 13/38; G06F 15/00
[52] U.S. Cl. .................................. 364/200; 364/222.2; 364/229.3; 364/242.94; 364/260.1; 340/825.05; 340/825.52
[58] Field of Search ... 364/200 MS File, 900 MS File; 340/825.5, 825.51, 825.05, 825.52; 370/85, 86, 88, 89

[56] References Cited

U.S. PATENT DOCUMENTS 4,124,890 11/1978 Vasenkov et al. ................. 364/200
4,159,470 6/1979 Strojny et al. ................. 340/825.05
4,398,176 8/1983 Dargel et al. ........................ 364/900
4,438,434 3/1984 Wason .............................. 340/825.51
4,516,201 5/1985 Warren et al. ....................... 364/200
4,549,219 10/1985 Sue et al. ......................... 340/825.05
4,550,437 10/1985 Kobayashi et al. ................... 364/200
4,562,539 12/1985 Vince ................................. 364/200
4,566,098 1/1986 Gammage et al. ............. 340/825.05
4,641,237 2/1987 Yabushita et al. ................... 364/200
4,644,496 2/1987 Andrews ............................. 364/900

FOREIGN PATENT DOCUMENTS 53-11541 7/1976 Japan .
53-11504 7/1976 Japan .
53-35444 9/1976 Japan .

OTHER PUBLICATIONS

FIG. 6–5, Overview of the IBM PC System Board.
Table 6–1, Showing the I/O Port Addresses Used by Standard Devices in the IBM PC.
FIG. 6–16, Showing Intel 8237A Four-Channel Direct Memory Access Controller.

Primary Examiner—Archie E. Williams, Jr.
Assistant Examiner—Thomas C. Lee
Attorney, Agent, or Firm—Bernard, Rothwell & Brown

[57] ABSTRACT

In a data transmission apparatus, a plurality of data processing modules are used and required sequence setting is performed to a port sequencer of input/output ports of each data processing module. The daisy chain transfer of the selective data transfer, the load distribution data transfer, the collective data transfer is combined between the data processing modules, thereby the data transmission is performed efficiently at high speed.

9 Claims, 16 Drawing Sheets

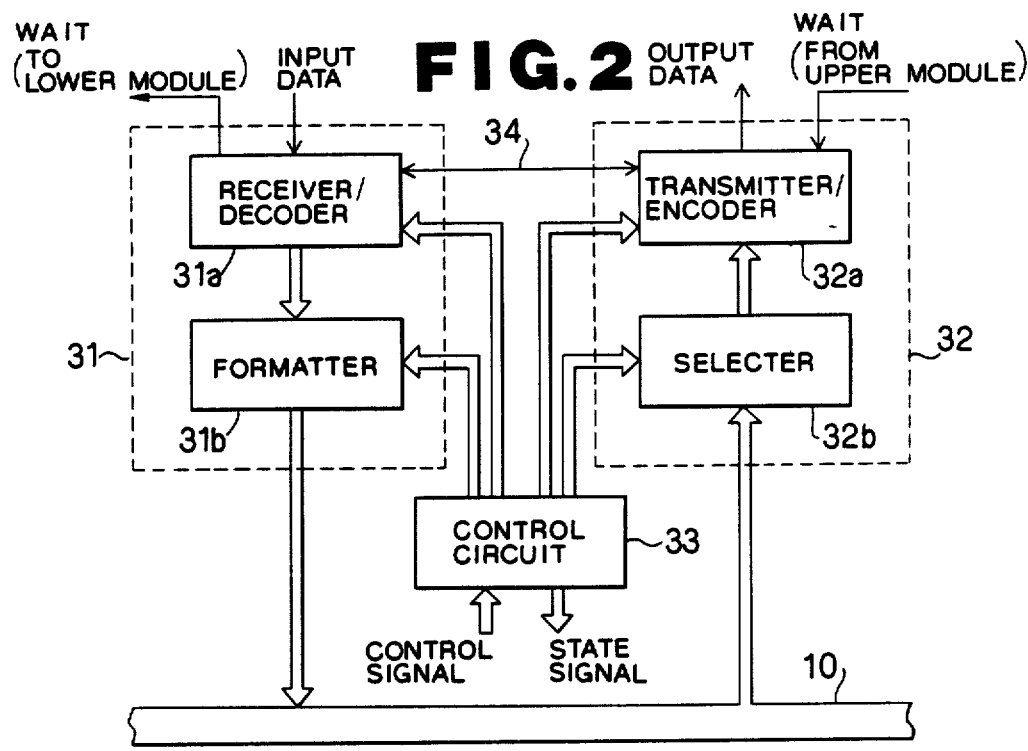
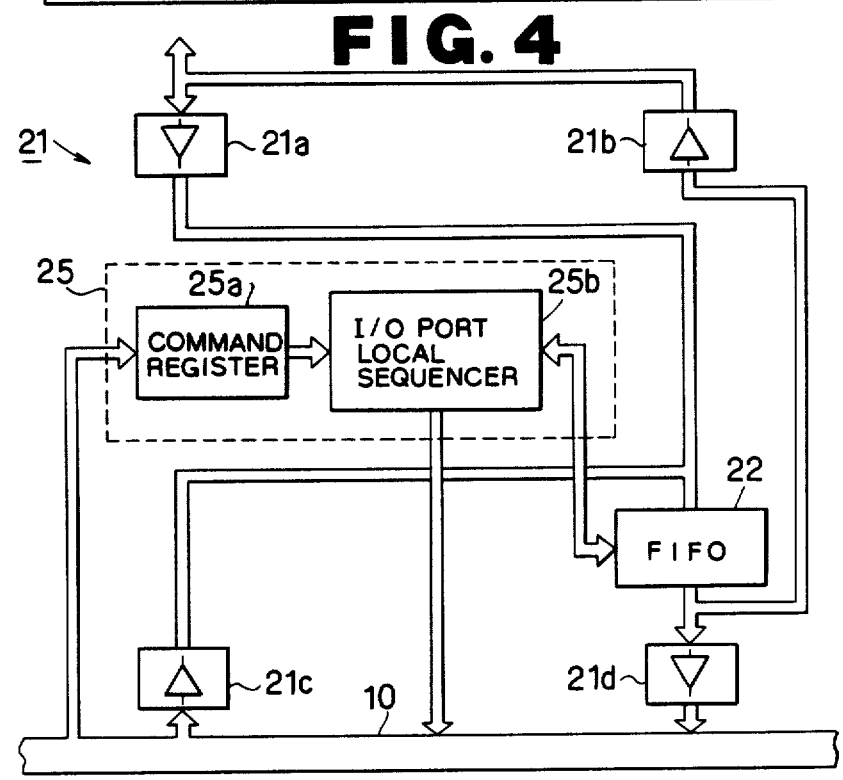

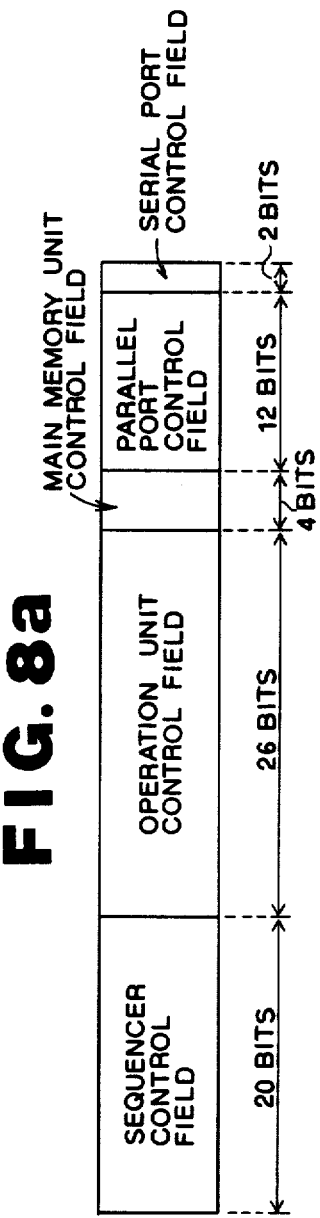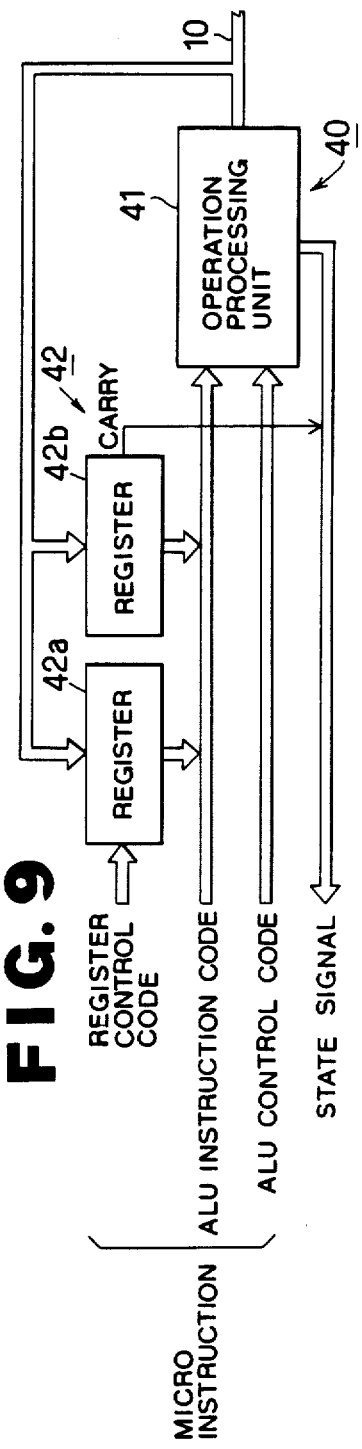

FIG. 18a (X = 0 OR 1)

| PORT | COMMAND | CMD (I) 3 | 2 | 1 | 0 |
|---|---|---|---|---|---|
| PI | INITIALIZATION | 0 | 0 | 0 | 0 |
| | UNCONDITIONAL INPUT | 1 | 0 | 0 | 0 |
| | UNCONDITIONAL BYPASS | 1 | 0 | 1 | X |
| | SELECTIVE INPUT / BYPASS | 1 | 1 | 0 | 1 |
| | LOAD DISTRIBUTION INPUT / BYPASS · $\overline{ARDY}$ | 1 | 1 | 1 | 0 |
| | LOAD DISTRIBUTION INPUT / BYPASS · ARDY | 1 | 1 | 1 | 1 |

FIG. 18b

| PORT | COMMAND | CMD (O) 2 | 1 | 0 |
|---|---|---|---|---|
| PO | INITIALIZATION | 0 | 0 | 0 |
| | FIFO WRITE · $\overline{DAISY}$ | 1 | 0 | 0 |
| | OUTPUT · $\overline{DAISY}$ | 1 | 1 | 0 |
| | FIFO WRITE · DAISY | 1 | 0 | 1 |
| | OUTPUT · DAISY | 1 | 1 | 1 |

FIG. 18c

| PORT | COMMAND | CMD(A)/CMD(B) 2 | 1 | 0 |
|---|---|---|---|---|
| PA / PB | INITIALIZATION | 0 | 0 | 0 |
| | INPUT | 1 | 0 | 0 |
| | FIFO WRITE | 1 | 0 | 1 |
| | OUTPUT | 1 | 1 | 1 |

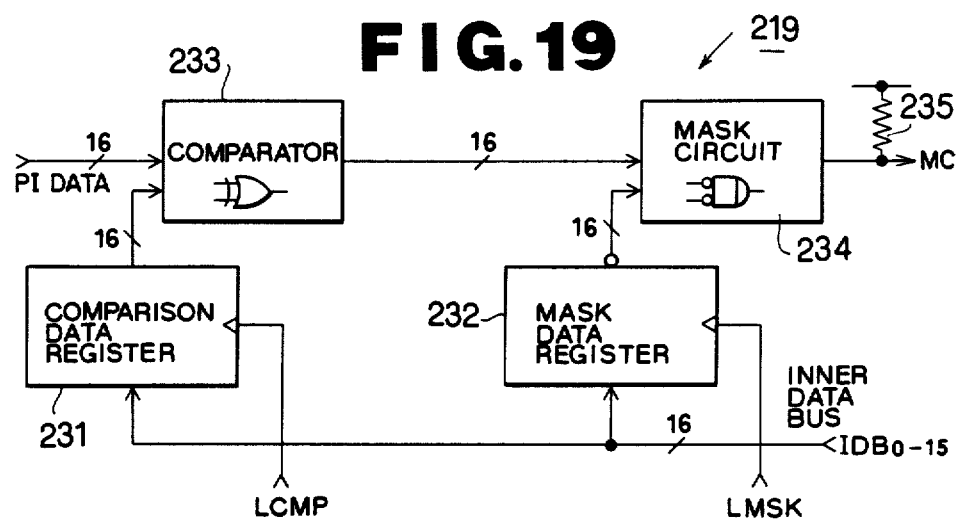
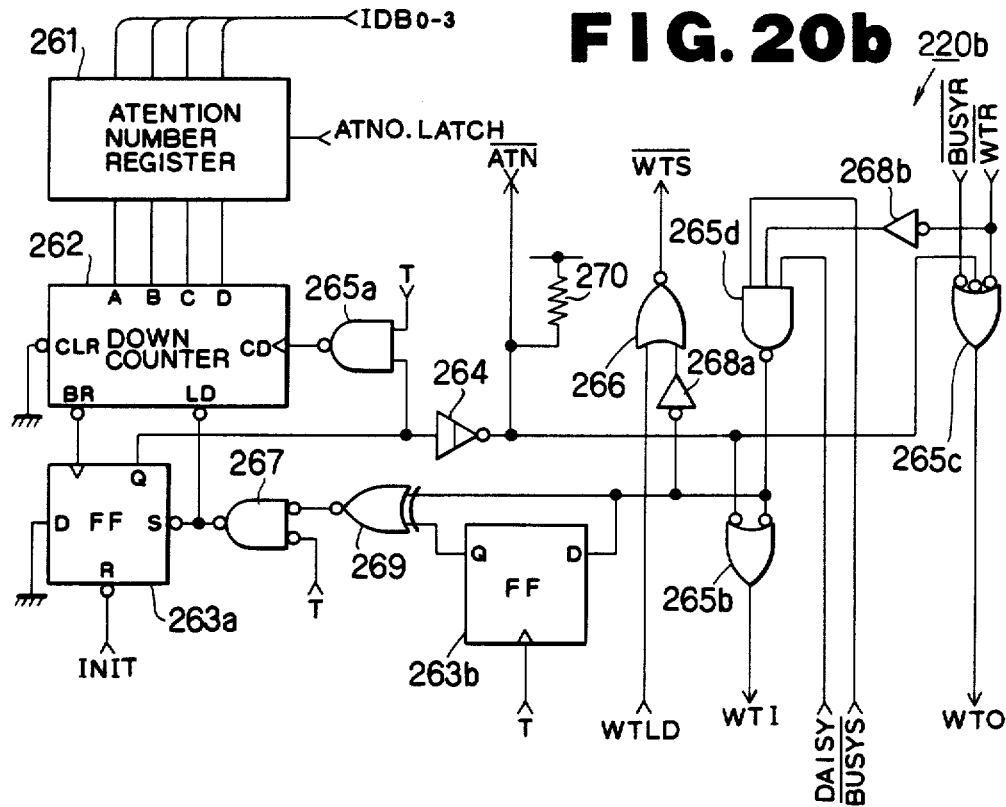

CASCADED INFORMATION PROCESSING MODULE HAVING OPERATION UNIT, PARALLEL PORT, AND SERIAL PORT FOR CONCURRENT DATA TRANSFER AND DATA PROCESSING

BACKGROUND OF THE INVENTION

1. Field of the Invention

The present invention relates to a data transmission apparatus which transmits data between a plurality of data processing units, and more specifically to a plurality of information processing modules each of which can function as one computer, and which in combination can be constituted as a versatile computer apparatus and can process in parallel.

2. Description of the Prior Art

There is shown in FIG. 10 an example of a data transmission apparatus between data processing units known in the prior art. Reference numeral 101 designates a bus comprising a control line, an address bus, a data bus or the like, and numerals 110a, 110b bus masters which can control and occupy the bus 101 and can input or output data. In the bus masters 110a, 110b, numerals 111a, 111b designate CPUs, numeral 112a an input/output port to transmit data to outside or receive it from outside, numeral 113a a memory, numerals 114a, 114b bus exchangers, and numerals 115a, 115b buffers. Numerals 130a, 130b designate bus slaves which cannot control and occupy the bus 101 but can input or output data to the bus masters 110a, 110b the first bus slave 130a is a system input/output port and the second bus slave 130b is a system memory. Numerals 131, 132 designate parallel and serial input/output ports respectively, numeral 133 a decoder, and numeral 134 a memory.

Operation of the data transmission apparatus will now be described.

The bus master 110a or 110b supplies address of the input/output port 130a or the system memory 130b to the address bus. In the writing operation, data is also supplied to the data bus. And then the bus master 110 generates any command of input/output reading and writing or memory reading and writing onto the command line, and the bus slave 130 corresponding to this responds. That is, the corresponding bus slave 130 takes data during the writing operation and outputs it to the bus during the reading operation. And then the bus slave 130 transmits the transfer recognition signal to the bus master 110, which finishes writing or reading cycle and stops transmission of command on the command line and removes the address and data from the bus; thereby one operation is completed.

Although single bus master 110 produces output in the above description, when one bus master is producing output and other bus master with high priority is intended to produce output, the bus changing is performed by the bus exchanger 114 and the data transfer of the bus master with higher priority may be performed.

In such data transmission apparatus in the prior art, however, when the bus master 110 produces output, the data processing unit at input side being opposite to the bus master 110 must be previously determined by the address bus in order to transmit data. Also when the bus master 110 is at input side, the data processing unit at output side must be previously determined in order to transmit data.

Particularly in a data driven- computer, when data are distributed in a plurality of data processing units in sequence from the light loaded data processing units or output data from the plurality of data processing units are collected in a single data processing unit, the system cannot be constituted practically. Furthermore, since the address setting is required at every time of transmission, the data transmission apparatus is unsuitable for high-speed transmission.

SUMMARY OF THE INVENTION

If a computer apparatus to satisfy various requirements is designed at every time of requirement, much labor will be required. On the contrary, if a desired computer apparatus is obtained by combining a plurality of information processing units, i.e. information processing modules, and providing each information processing module with required function, various requirements can be easily satisfied and the designing labor be significantly reduced and further the development of the computer apparatus be facilitated. The present invention has been made on the basis of such idea.

In order to realize the idea, the information processing module must satisfy following conditions or preferably satisfy them.

(1) Each module in itself has function as a computer.

(2) Each module can be provided with function freely.

(3) Data can be transmitted or received freely between modules.

(4) Modules may stand on an equal status or relation of master and slave with each other.

(5) Hardware regarding all modules is homogeneous.

(6) Parallel processing in each module is possible.

(7) Load can be distributed by installing modules having the same function.

(8) A plurality of modules can be combined, and the modules can be coupled with a computer having different constitution from that of the modules.

An object of the invention is to provide an information processing module wherein above-mentioned conditions are satisfied, waste in the hardware is eliminated without deteriorating, the versatility, and the parallel processing is rapidly executed.

Form of the information processing module may be that enclosed in a cabinet, that assembled on a printed circuit board, that made as one LSI, that made as one block in LSI corresponding to the computer apparatus or the like. For example, even at the last mentioned form mode, combination of blocks of the module can simplify the hardware designing.

Another object of the invention is to provide a data transmission apparatus which can perform data transmission between data processing units at high speed without using an address bus, and is particularly suitable in use for a data driven computer so as to realize the high-speed operation.

Other objects and advantages of the invention will be apparent from the following detailed description of embodiments taken in connection with the accompanying drawings.

BRIEF DESCRIPTION OF THE DRAWINGS

FIG. 2 is a schematic block diagram of a serial port;

FIG. 4 is a schematic block diagram of an input/output port;

FIGS. 8a and 8b are format diagrams of micro command;

FIG. 9 is a schematic block diagram of operation part;

FIGS. 18a -18c are diagrams illustrating port command of each port;

FIG. 19 is a function block diagram of a comparator of the apparatus;

FIG. 20b is a diagram illustrating an attention wait signal generating part of a daisy chain controller of the apparatus;

DETAILED DESCRIPTION OF THE PREFERRED EMBODIMENT

An embodiment of the invention will now be described in detail referring to the accompanying drawings.

Figure 1:
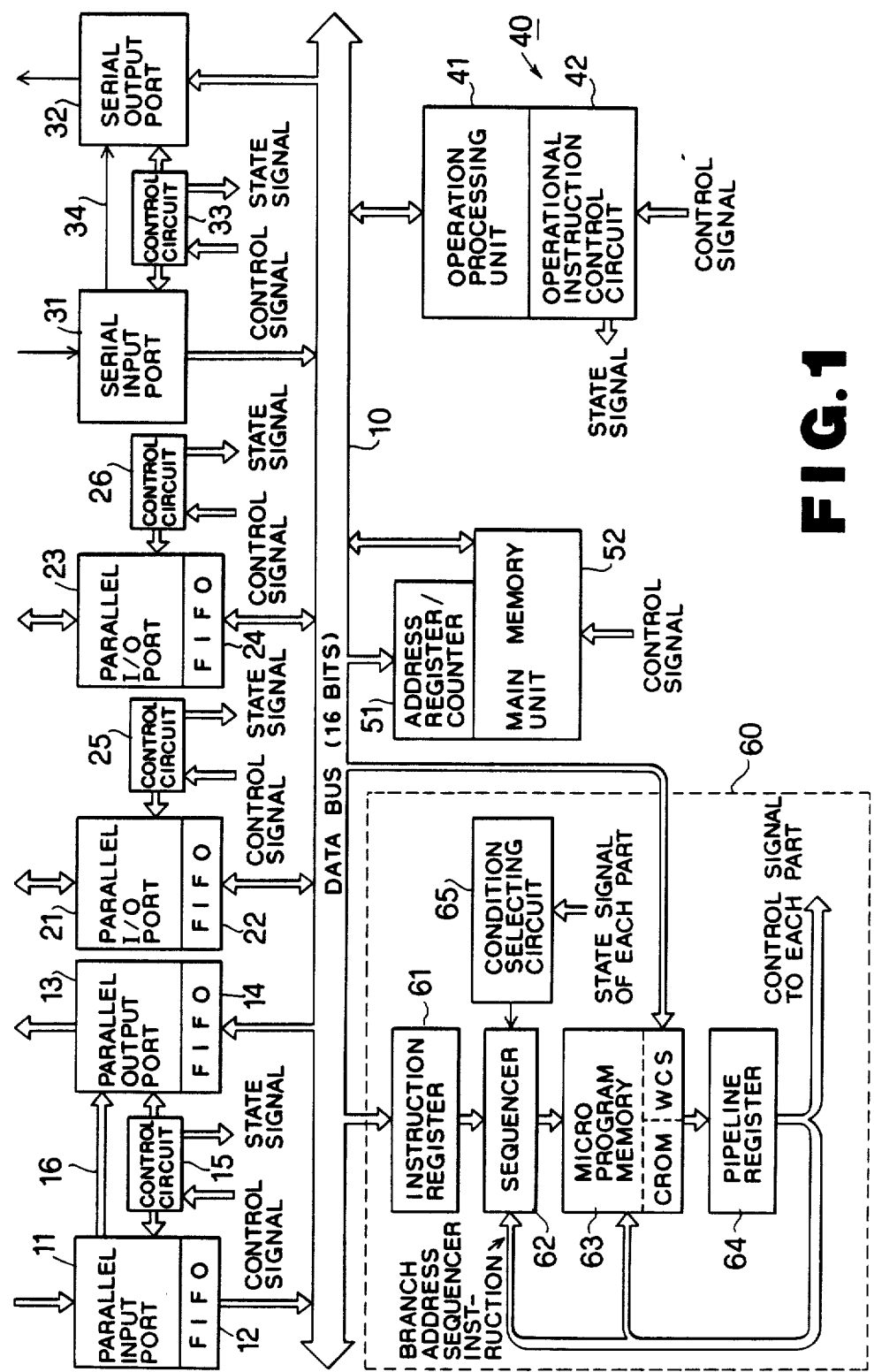
FIG. 1 is a schematic block diagram of a module as a whole of one embodiment of the invention.

FIG. 1 is a block diagram of an information processing module according to the invention, and outline of the whole constitution will be first described. In FIG. 1, numeral 60 designates a central control unit which is the control center of the module of the invention and constituted as a data processing unit in microprogram system. The central control unit 60 is connected to a data bus 10 constituted in 16 bits, and comprises an instruction register 61 of 8 bits to take and store macroprogram stored in a main memory unit 52 as hereinafter described, a condition selecting circuit 65 to supply a prescribed control signal to a sequencer 62 in response to state signal inputted from each circuit member as hereinafter described, a sequencer 62 which is controlled according to input from the selecting circuit 65 and input from a pipeline register 64 and performs the sequence control of the micro instruction in response to output of the instruction register 61, a microprogram memory 63 to write the microprogram, and a pipeline register 64 as an output register of the microprogram memory 63. Output of the pipeline register 64 becomes control signal of the microprogram memory 63 and the sequencer 62 in the central control unit 60 and control signal of each part outside the central control unit 60. The microprogram memory 63 is provided with field where a fixed microprogram is written and field where a user can write a microprogram freely, and the former field is hereinafter referred to as CROM and the latter field is as WCS.

Numeral 52 designates a main memory unit which is provided with fields to store the macroprogram and data entered from outside of the module respectively, and with an address counter 51 to assign the write/read address. The address register/counter 51 and main memory unit 52 are connected to the data bus 10, and the main memory unit 52 is supplied with a control signal from the pipeline register 64.

Numeral 40 designates an operation unit which comprises an operation processing unit 41 and an operational instruction control circuit 42. The operation processing unit 41 takes data stored in the main memory unit 52 or data entered from various input ports as hereinafter described and executes an operation on data, and is controlled by the operational instruction control circuit 42. The operational instruction control circuit 42 receives control signals from the pipeline register 64 and generates state signals to the condition selecting circuit 65.

Various input/output ports will now be described. The module is provided with a parallel input port 11, a parallel output port 13, parallel input/output ports 21, 23, a series input port 31 and a series output port 32, with the parallel ports being 16 bit ports. The parallel ports 11, 13, 21, 23 are provided with buffer registers of first-in and first-out type (hereinafter referred to as "FIFO") 12, 14, 22, 24, respectively, so as to perform the buffer storage of data to be inputted or outputted, particularly data of plural words (16 words in the embodiment), i.e. block data (packet). A data transfer line 16 is installed between the parallel input port 11 and the parallel output port 13 so that data entered in the input port 11 can be transferred directly to the output port 13. A data transfer line 34 in similar constitution is installed between the series input port 31 and the series output port 32.

A control circuit 15 performs the local control of the parallel input port 11 and the parallel output port 13, and corresponding to content of data entered in the input port 11 and state of the FIFO 12, the operation processing unit 41 or the like, data is transferred through the data transfer line 16 and the output port 13 to another module or received in the FIFO 12 from which data is transferred to the operation processing unit 41 or the main memory unit 52. The control circuit 15 also controls the data storage and reading of the FIFO 14, data output from the output port 13 or the like.

Control circuits 25, 26 perform the local control of the input/output ports 21, 12, respectively, and control the data input and output and the data storage and reading to the FIFO 22, 24, corresponding to content of the inputted data and state of the FIFO 22, 24, the operation processing unit 41 or the like.

A control circuit 33 performs the local control of the series input port 31 and the series output port 32, and corresponding to content of data entered in the input port 31 and state of the main memory unit 52, the microprogram memory 63 or the like, data is transferred via the data transfer line 34 and the output port 32 to another module, or data is transferred to the main memory unit 52 or the microprogram memory 63.

Constitution of parts as above described in the outline will be described further in detail.

Serial Ports:

First, the serial ports 31, 32 will be described referring to FIG. 2. The input port 31 is used in the embodiment mainly as an input port for the macroprogram to be stored in the main memory unit 52 and the microprogram to be stored in the WCS of the microprogram memory 63. Each module is provided with inherent function by these programs. In the receiving mode to receive such programs, in the input port 31, data transmitted to the module is received at a receiver/decoder 31a thereof and subjected to series/parallel conversion and the converted data is reproduced into 16 bits at a formatter 31b thereof and then transmitted to the data bus 10.

In the transmission mode, data of 16 bits on the data bus 10 are selected and taken by a selector 32b of the output port 32 and separated into upper and lower bytes, and the separated data are loaded in sequence to a transmitter/encoder 32a and subjected to parallel/series conversion and then transmitted.

The module is connected with plural modules of similar constitution in cascade connection using the respective input/output ports 31, 32. The modules are designated by numerals in sequence from the module near the host computer or other computer. In the transmission mode as above described, in order to inhibit the receiving of data, a WAIT signal is applied to the next lower numbered module to inhibit the transmission of data to the input port 31 from the lower module (module with smaller numeral, i.e. module near the host computer). Also during the transfer mode when a WAIT signal is from the next upper module, a WAIT signal is outputted to the next lower module until the error is eliminated.

In addition to the receiving mode and the transmission mode, operation of the ports 31, 32 includes a transfer mode. In the transfer mode, serial data is transferred from the receiver/decoder 31a through the data transfer line 34 to the transmitter/ encoder 32a, and further transferred to the next upper module. Also in this case, data are read out from the formatter 31b to the data bus 10 in similar manner to the receiving mode. Consequently, except for the special case, operation in the transfer mode enables the taking of input data and the transfer to the upper module simultaneously. When data of an execution stop or interrupt instruction are, received by the serial port 31, the data are taken in the central control unit 60 of the module and the interrupt processing is started and at the same time the data are transferred through the data transfer line 34 to the next upper module and the similar interrupt is performed also in the upper module.

Parallel Ports:

Next, the parallel ports will be described. The input port 11 and the output port 13 are constituted to enable the handshaking transfer between modules at correspondence of one to one and the daisy chain transfer between plural modules, and the input/output ports 21, 23 are constituted to enable the changing of input and output and the handshaking transfer only. However, the input/output ports 21, 23 may be used also as the highest number port or the last port in the daisy chain transfer (refer to FIG. 6).

Figure 3:
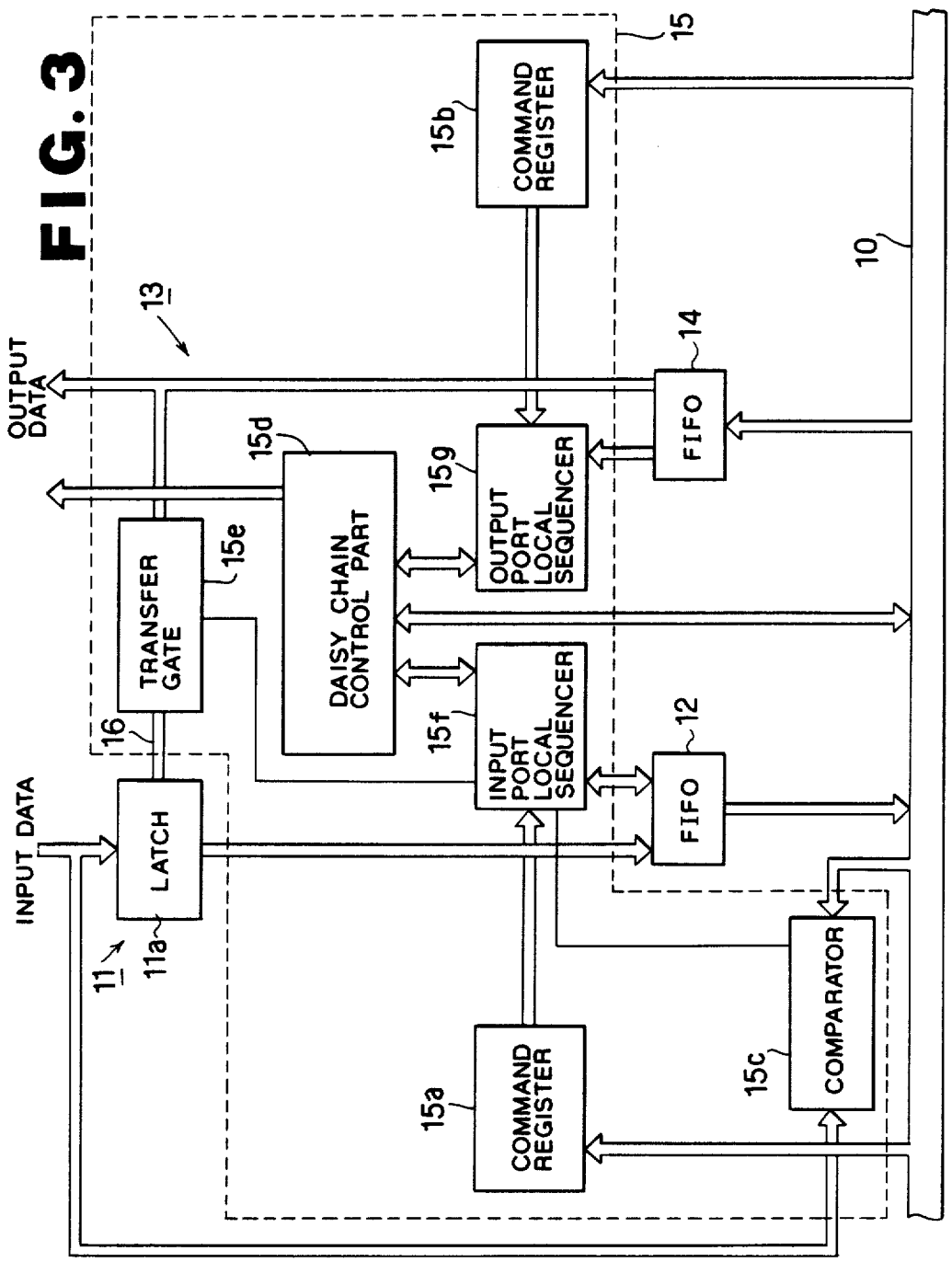
FIG. 3 is a schematic block diagram of a parallel input/output port.

FIG. 3 shows the input port 11 and the output port 13. The input port 11 is composed of a latch 11a and terminals, and the output port 13 is composed of an output line and several gates (not shown). The latch 11a is installed as a delay circuit for the delayed transmission by one clock per one module in the case of daisy chain transfer. The control circuit 15 comprises command registers 15a, 15b to receive and hold the control signal from the central control unit 60 and to determine the mode of operation of each port, a comparator 15c for the function distribution (described later) in the case of daisy chain transfer, a daisy chain control part 15d to generate the control signal for the load distribution (described later), a transfer gate 15e interposed on the midway of the daisy transfer line 16 for controlling the data transfer from the input port 11 to the output port 13, and local sequencers 15f, 15g for controlling the input port 11 and the output port 13 respectively.

FIG. 4 shows structure of the input/output port 21 (or 23). The input/output port 21 is provided with four switching buffers 21a, 21b, 21c, 21d, and can be changed for input or output using these buffers. The control circuit 25 comprises a command register 25a and a local sequencer 25b in similar manner to above description.

Figure 5:
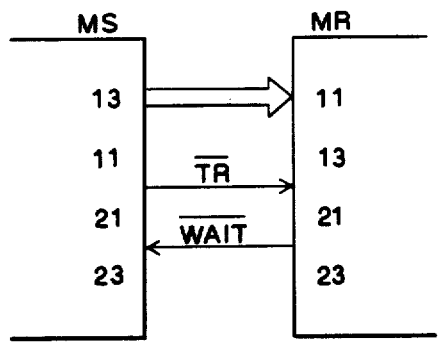
FIG. 5 is a diagram illustrating handshaking transfer.

The data transfer using these parallel ports will be described. In the handshaking transfer, transfer is performed with another module in the correspondence of one to one, and the block data transfer in 16 bits and 16 words (capacity of FIFO 12, 14, 22 or 24) is possible. Referring to FIG. 5, the handshaking transfer is performed so that data are transferred from the output port 13 for example of the transmission side module MS to the input port 11 for example of the receiving side module MR. However, block data are also transferred by handshaking transfer, and signal $\overline{TR}$ indicates the transmission state of the block data and signal $\overline{WAIT}$ to indicates the state that the receiving side module MR cannot receive data because of some reason to control the handshaking transfer.

Figure 6A:
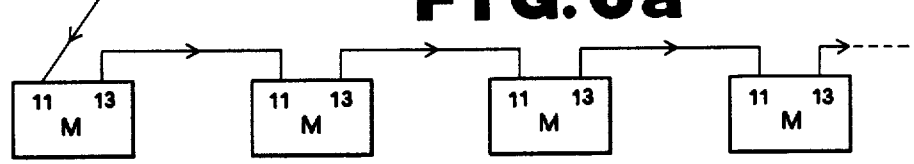
FIGS. 6a and 6b are diagrams illustrating daisy chain transfer.
Figure 6B:
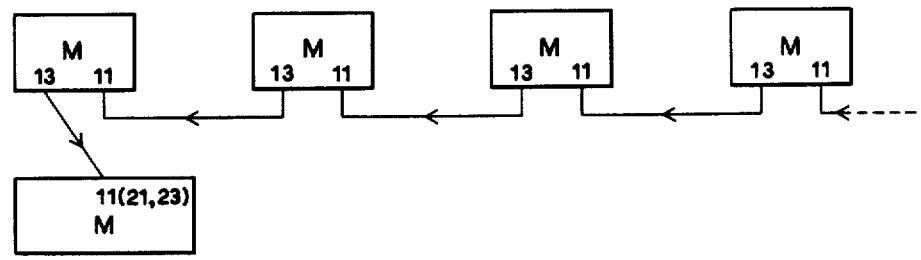

Next, the daisy chain transfer will be described. In the daisy chain transfer, data are transferred from one output port to an input port of the next module, from an output port of the next module to an input port of the following next module, and so on from module to module. The apparatus of the invention enables transfer of the block data of 16 bits and 16 words using the daisy chain transfer. FIGS. 6a and 6b show the connection method in the daisy chain transfer, and the modules M are connected in the cascade connection using the input port 11 and the output port 13 of each module M.

The daisy chain transfer in the apparatus of the invention has plural modes as hereinafter described. Consequently, the modules are connected using a number of signal lines in addition to the bus for the data transfer.

Load Distribution Mode (according to connection in FIG. 6a)

The load distribution mode is a working mode where loads are distributed between plural modules M, M . . . supplied with the same function. That is, if the load of any module M is too great, a new load is transferred to another module M.

Explaining this more specifically, the daisy chain control part 15d outputs ALU READY signal ARDY representing "0" or "1" to enable use of both the FIFO 12 and the operation processing unit 41, and BUFFER READY signal BRDY representing "0" or "1" to enable use of only the FIFO 12. In the load distribution mode, if there is a module where signal ARDY is "1" and signal BRDY is "0", and another module where both signal BRDY and signal ARDY are "0", the latter is decided as the least load and supplied with the block data. If both signal ARDY and signal BRDY are "1" in all modules, the block data coming from a module at the top end of the chain is set to the holding state of the first word at the latch 11a of next module and the hereinafter data transfer is stopped. If signal BRDY becomes "0" in this module, the block data is supplied to this module. If BRDY=0 in another module, the block data is supplied to that module.

Function Distribution Mode (according to connection in FIG 6a)

In a computer apparatus constituted by combination of many modes of the invention, each module is supplied with inherent function. Consequently, the transferred block data are not required by all modules. Then selection is necessary regarding whether the block data is to be received or transferred. Function distribution mode is for this selection.

In the function distribution mode, data corresponding to function of each module are set to the comparator 15c, and the first word in the block data inputted to the input port 11 is compared with the setting data of the comparator 15c, and the decision of the receiving or the transfer is effected on the basis of the comparison results. In the case of transfer, data are transferred through the data transfer line 16, the transfer gate 15e and the output port 13 to another module.

Collection Mode (according to connection in FIG. 6b)

Basic operation of collection mode is in that block data outputted from plural modules are collected in the input port 11 of one module. In the collection mode, when the output port 13 of one module is producing output and another module at the upstream side of the data transfer is going to perform the block data transfer, a wait signal is generated from the outputting module to the other module at the upstream side; thereby the block data at the other module is at a waiting state until the outputting module finishes its output.

Main Memory Unit:

As above described, the main memory unit 52 includes field (second memory unit in claims) to store the macroprogram (second program in claims) and field (third memory unit in claims) to store data inputted through each port and other data by operation within the module, and comprises RAM (random access memory) in itself.

Figure 7:
FIG. 7 is a format diagram of macro command.
Figure 10:
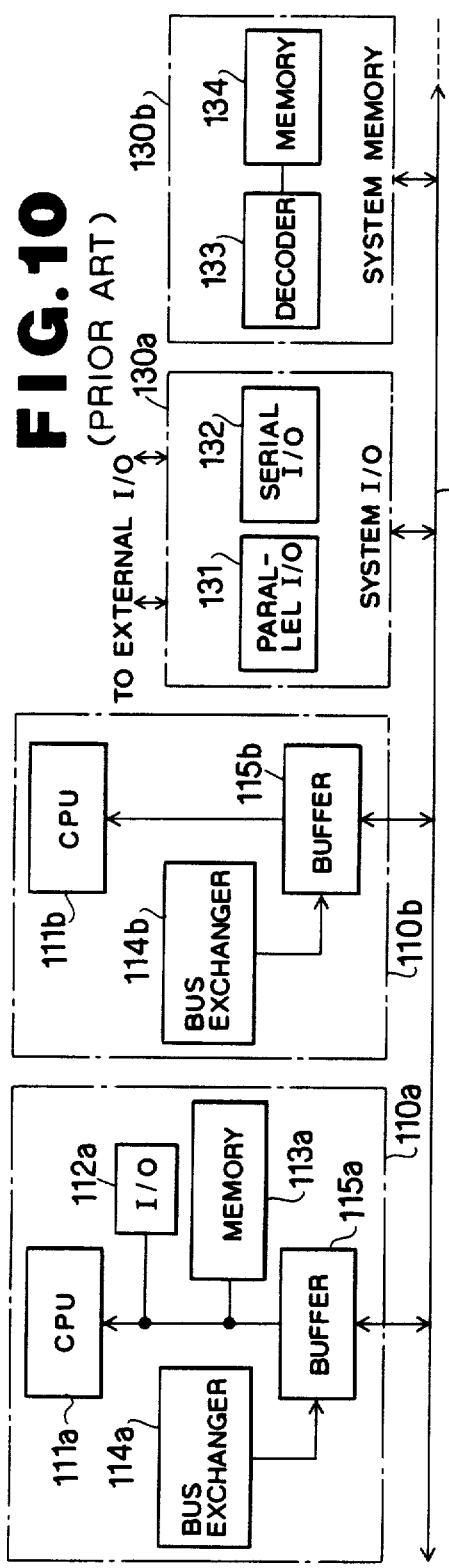
FIG. 10 is a diagram of an example of a data transmission apparatus between data processing units in the prior art.

FIG. 7 shows a format of the macro instruction, comprising the instruction word at MSB side, and first operand and second operand at LSB side. In the case of instruction of two words, the second word is made third operand.

The address register/counter 51 can access to the main memory unit 52 by address set thereto. Thereby the read data can be loaded directly to the address register/counter 51 and assigned as address to be accessed next. Since the indirect address assigning of the main memory unit 52 can be performed at multiple stages and at self support, the list processing becomes easy. Furthermore, the address can be incremented automatically and accessed in sequence. That is, the data read/write of the address increment can be performed at self support.

The address register/counter 51 may be used not only when reading or writing to the main memory unit 52 but also when loading the microprogram for the macro instruction execution in the WCS of the microprogram memory 63.

Central Control Unit:

The central control unit 60 will be described. The microprogram is loaded through the serial input port 31 to the WCS of the memory 63 as above described. The load address is supplied by the address register/counter 51. The microprogram in memory 63 and the macroprogram stored in the main memory unit 52 determine function and property of the module. The CROM contains the microprogram common to all modules, such as initializing routine of each part, data loader to WCS, data loader to the main memory unit 52.

The macro instruction is read out to the data bus 10 by means of the address register/counter 51 as above described.

The instruction register 61 takes and latches the instruction code in the macro instruction from upper byte of the data bus, and converts it into address of the micro instruction and supplies the converted address to the sequencer 62.

The sequencer 62 performs the sequential control of the micro instruction, and the control is dependent on the sequencer instruction in the micro instruction itself and signals from the condition selecting circuit 65 (signals selected from the state signals as an object during the conditional branch of the micro instruction).

The address supplied to the CROM, WCS of the memory 63 by the sequencer 62 is the address from the instruction register 61 or a branch address in the micro instruction. The micro instruction of 64 bits is read out by such address from the WCS or CROM. The micro instruction has formats as shown in FIGS. 8a and 8b. The format is horizontal type to control each part directly, thereby the sequencer 62, the operation processing unit 41, the main memory unit 52, the parallel and series ports 11–32 and the like can be controlled concurrently.

FIG. 8a shows the format of the microprogram at the normal control state. The format is constituted from upper side by the sequencer control field of 20 bits (including the sequencer instruction of 4 bits, the branch address of 12 bits, and the condition select signal of 4 bits to be supplied to the condition selecting circuit 65), the control field of 26 bits for the operation unit 40, the control field of 4 bits for the main memory unit 52, the parallel port control field of 12 bits, and the serial port control field of 2 bits.

FIG. 8b shows the format of the microprogram at the WCS loading state. FIG. 8b is different from FIG. 8a only in that the WCS control field is provided in place of the main memory unit control field. The micro instruction of such format is outputted from the pipeline register 64 and then transmitted to various parts.

Operation Unit:

FIG. 9 is a block diagram of the operation unit 40. As above described, upper byte of the macro instruction, i.e. the instruction code is taken by the instruction register 61, but the first operand and the second operand at lower byte are taken respectively by the registers 42a and 42b having counter function of the operation instruction control circuit 42.

The first operand represents the destination register number, and the second operand represents immediate value of the source register number, the shift number or the like. The carry signal (one bit) of the register 42b as the state signal is transmitted together with the state signal of 3 bits of the operation processing unit 41 into the central control unit 60. These registers 42a, 42b are supplied with the register control code of 6 bits among the operation unit control field of 26 bits in the micro instruction thereby interpretation of the operand is performed, and the register control code together with the operation processing unit (ALU) instruction code of 16 bits is supplied to the operation processing unit 41.

Residual 4 bits are supplied as the ALU control code to the operation processing unit 41.

The operation processing unit 41 supplied with above-mentioned codes is a controller/processor of 16 bits, and performs the operation processing and the processing execution control.

The module in the embodiment entirely satisfies the above-mentioned requirements and is excellent in versatility and flexibility and therefore has quite high completion as a constitution element for various computer apparatuses.

Each port is locally controlled and the data transfer processing and the internal processing such as operation processing are performed independently and concurrently, and further the processing itself in each port can be performed at high speed by means of the FIFO and the control circuit exclusive for the port, the module of the embodiment is characterized in that the concurrent processing at high speed is not restricted by the data transfer processing speed.

Since the homogeneous modules can be connected with each other in daisy chain connection, the reasonable load distribution can be realized easily to modules provided with the same function. Furthermore, since each module may be provided with any function, connection of the many modules can constitute various systems to experiment and to develop, particularly systems to enable the concurrent processing. For example, the modules are suitable for the emulation system in concurrent processing.

Figure 11:
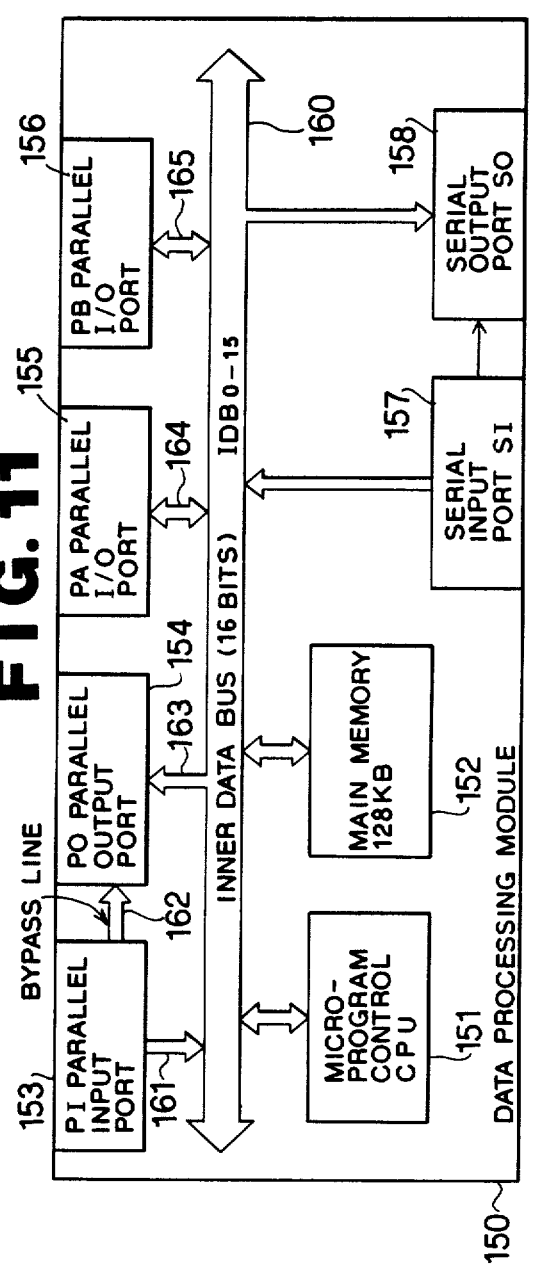
FIG. 11 is a block constitution diagram of a data processing unit to be used in a data transmission apparatus as an embodiment of the invention.

Another embodiment of the invention will now be described referring to the accompanying drawings. FIG. 11 is a block diagram of a data processing module (hereinafter referred to as "module") in this embodiment. In FIG. 11, numeral 150 designates a module, numeral 151 a microprogram control CPU (sequence setting means) for performing the control and operation of the whole module, numeral 152 a main memory, and numerals 153, 154, 155, 156 a parallel input port (PI), a parallel output port (PO), a parallel input/output port (PA), and a parallel input/output port (PB) respectively, which are operated at self support in response to the command from the microprogram control CPU 151. Numeral 160 designates an inner data bus, numeral 161 a transfer line from the PI 153 to the inner data bus 160, numeral 162 a bypass line from the PI 153 to the PO 154, numeral 163 a transfer line from the inner data bus 160 to the PO 154, numeral 164 a bi-directional transfer line between the PA 155 and the inner data bus 160, numeral 165 a bi-directional transfer line between the PB 156 and the inner data bus 160, numeral 157 a serial input port (SI), and numeral 158 a serial output port (SO).

The SI 157 and the SO 158 are used for the initialization, starting, stopping of program or data. The microprogram control CPU 151 has boot program, and a program with some meaning is loaded through the serial ports 157, 158 to the main memory 152. If the starting is effected also through the serial ports 157, 158, the module 150 performs the data transmission using the parallel ports 153, 154, 155, 156, and calculation corresponding to the inner program and various operation processings.

Figure 12:
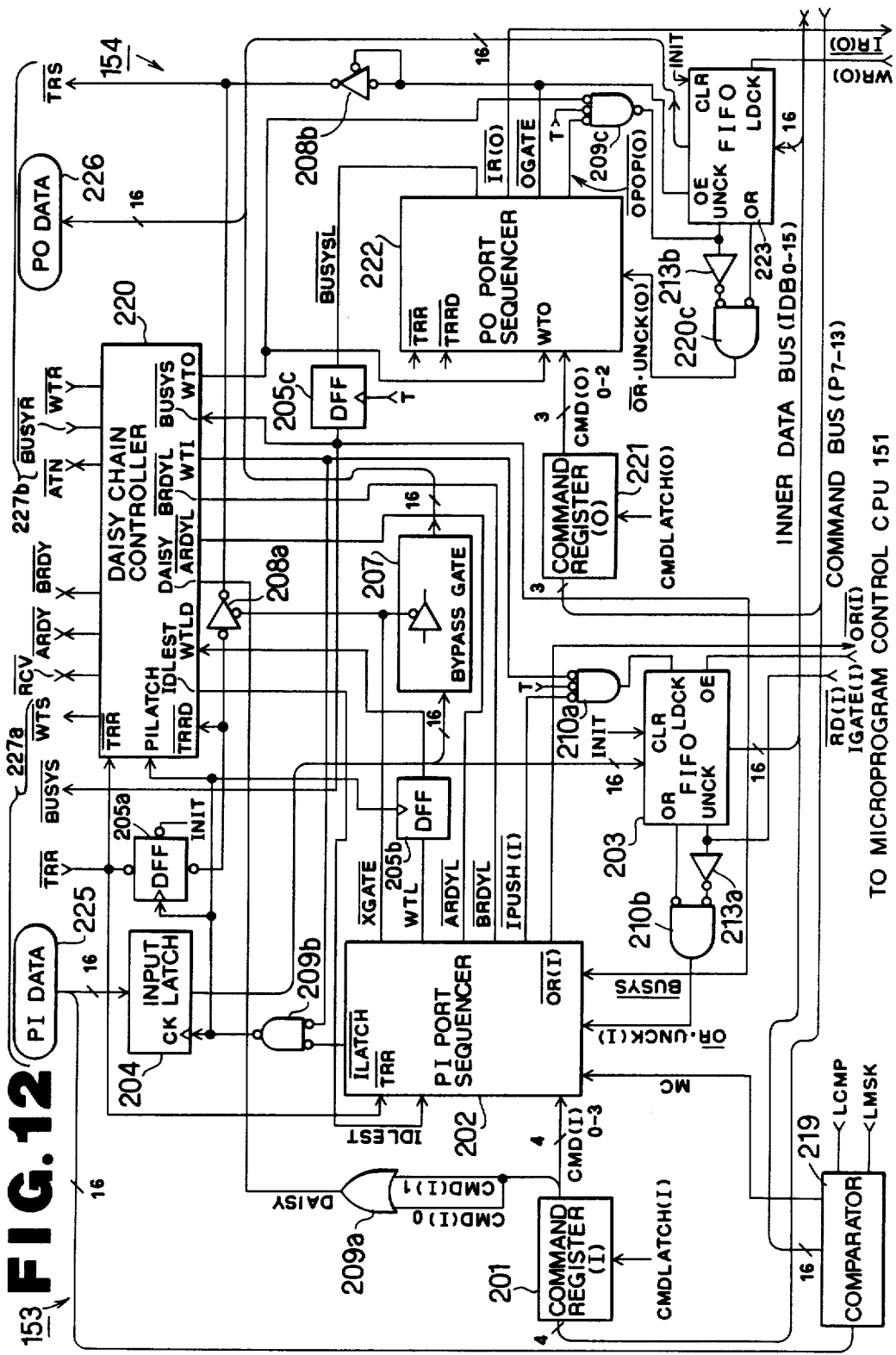
FIG. 12 is a function block diagram of a parallel input port (PI) and a parallel output port (PO) of the apparatus.

The parallel ports 153, 154, 155, 156 of the module 150 will be described. FIG. 12 is a function block diagram of the PI 153 and the PO 154. In FIG. 12, numeral 201 designates a command register (I) of the PI 153, numeral 202 PI port sequencer, numeral 203 FIFO (First-in First-out memory) of the PI 153, numeral 204 an input latch, numerals 205a, 205b and 205c D flip-flops, numeral 207 a bypass gate in three-state gate, numeral 208a and 208b three-state gates, numeral 209a, 209b and 209c OR, gates, numerals 210a, 210b NOR gates, numerals 213a, 213b inverters, numeral 219 a comparator, and numeral 220 a daisy chain controller. Numeral 221 designates a command register (O) of the PO 154, numeral 222 PO port sequencer, numeral 223 FIFO, numeral 225 a data bus for the PI 153, numeral 226 a data bus for the PO 154, and 227a and 227b parallel input port and a parallel output port, respectively.

Figure 13:
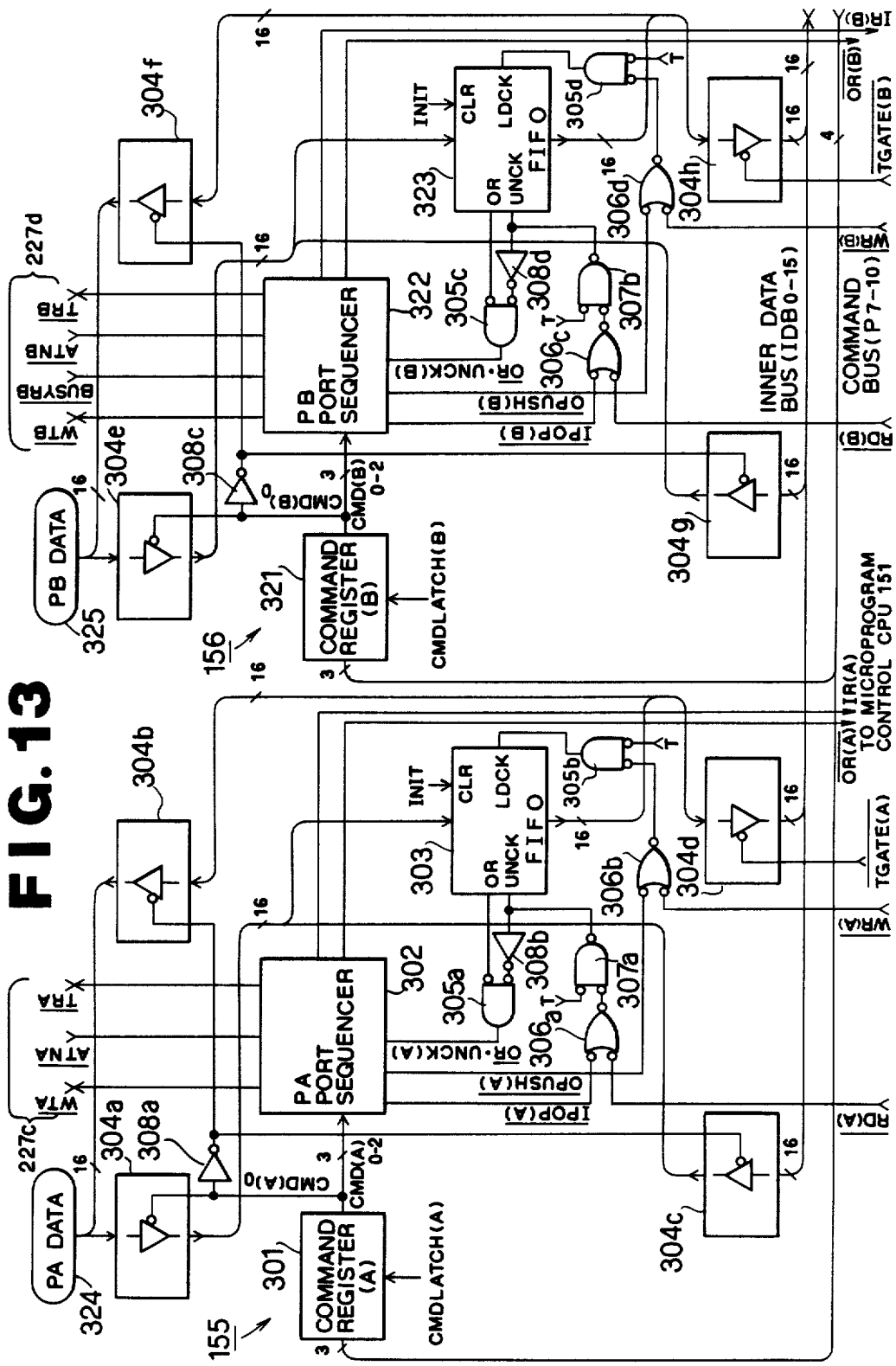
FIG. 13 is a function block diagram of parallel input/output ports (PA, PB) of the apparatus.

FIG. 13 is a function block diagram of the PA 155 and the PB 156. In FIG. 13, numeral 301 designates a command register (A) of the PA 155, numeral 302 PA port sequencer, numeral 303 FIFO of the PA 155, numerals 304a, 304b, 304c, 304d, 304e, 304f, 304g and 304h three-state buffers, numerals 305a, 305b, 305c and 305d NOR gates, numerals 306a, 306b, 306c and 306d AND gates, numerals 307a and 307b NOR gates, numerals 308a, 308b, 308c and 308d inverters. Numeral 321 designates a command register (B) of the PB 156, numeral 322 PB port sequencer, numeral 323 FIFO of the PB 156, numeral 324 a data bus for the PA 155, and numeral 325 a data bus for the PB 156.

Figure 14:
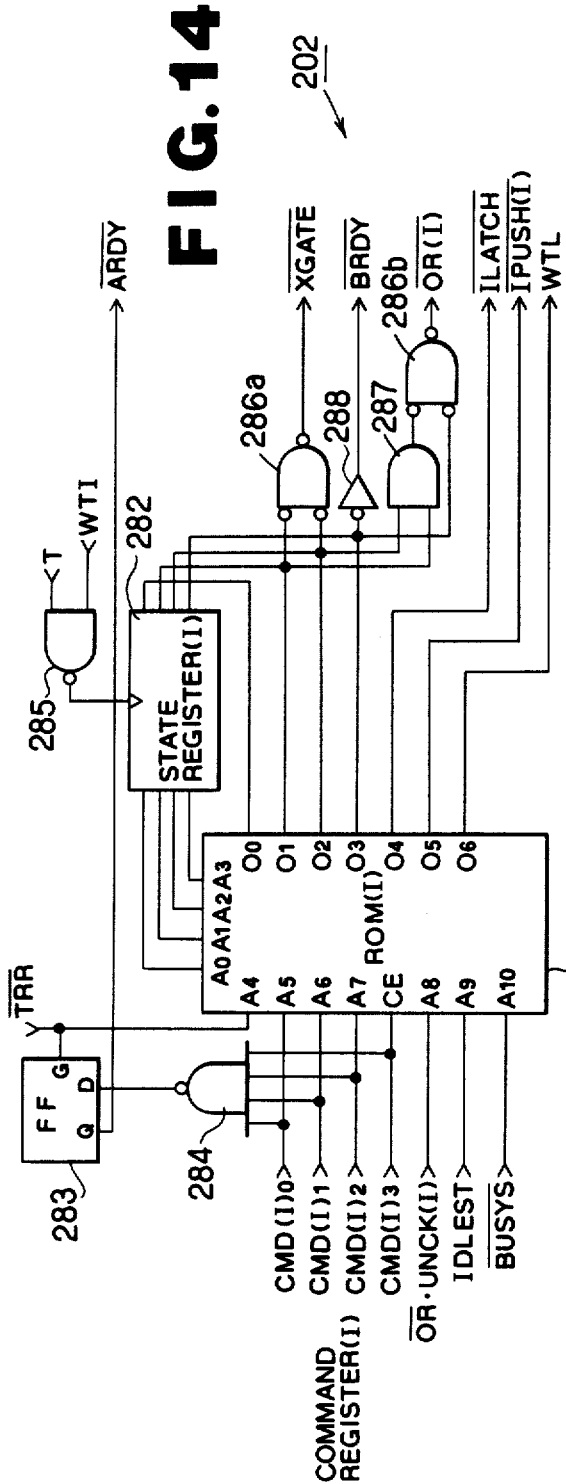
FIG. 14 is a constitution diagram of a PI port sequencer of the apparatus.

FIG. 14 is a diagram illustrating a constitution example of the PI port sequencer 202 of FIG. 12. In FIG. 14, numeral 281 designates a read only memory ROM (I) to store the sequence, numeral 282 a state register (I), numeral 283 a flip-flop (FF) of transparent type, numerals 284, 285 NAND gates, numeral 286a and 286b OR gates, numeral 287 AND gate, and numeral 288 an inverter.

Figure 15:
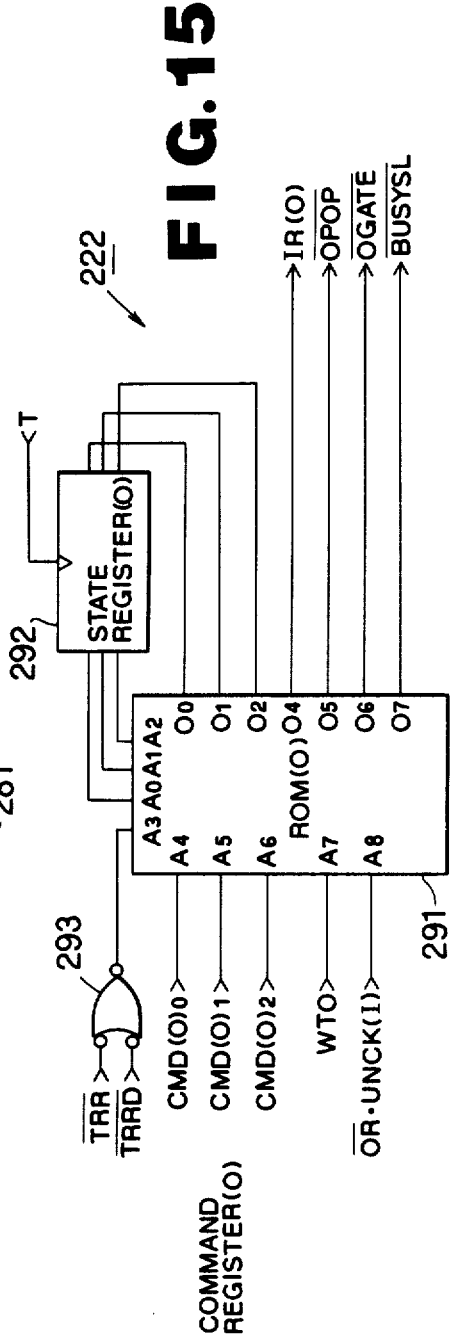
FIG. 15 is a constitution diagram of a PO port sequencer of the apparatus.

FIG. 15 is a diagram illustrating a constitution example of the PO port sequencer 222 of FIG. 12. In FIG. 15, numeral 291 designates a read only memory ROM (O), numeral 292 a state register (O), and numeral 293 AND gate.

Figure 16:
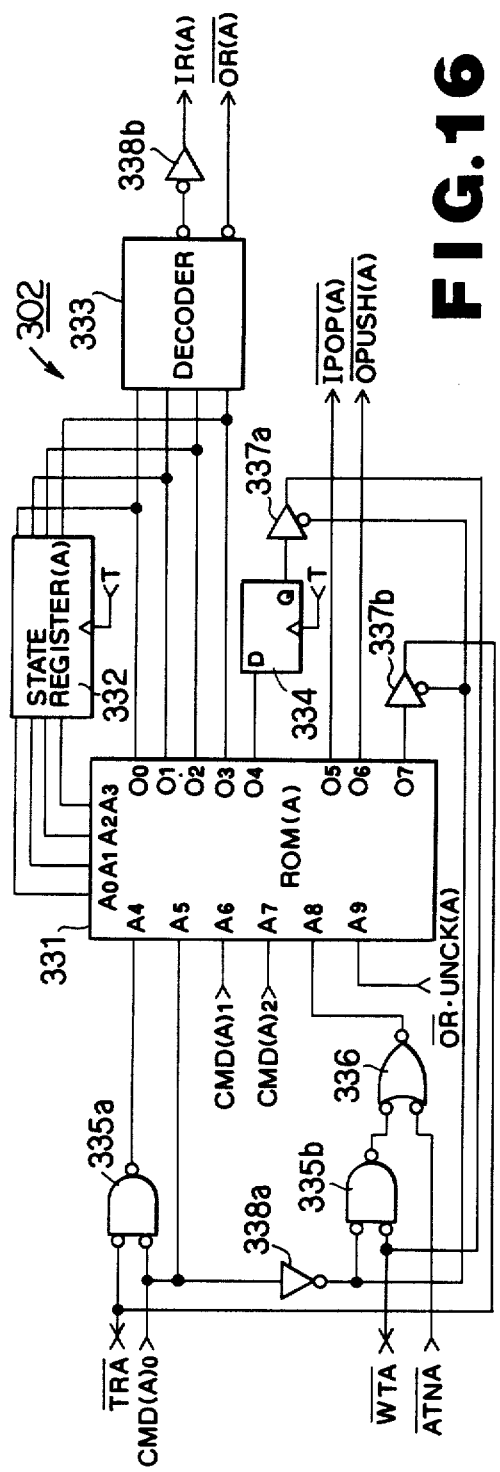
FIG. 16 is a constitution diagram of a PA port sequencer of the apparatus.

FIG. 16 is a diagram illustrating a constitution example of the PA port sequencer 302 of FIG. 13. In FIG. 16, numeral 331 designates a read only memory ROM (A), numeral 332 a state register (A), numeral 333 a decoder, numeral 334 D flip-flop, numerals 335a and 335b OR gates, numeral 336 AND gate, numerals 337a and 337b three-state buffers, and numeral 338 an inverter.

Figure 17:
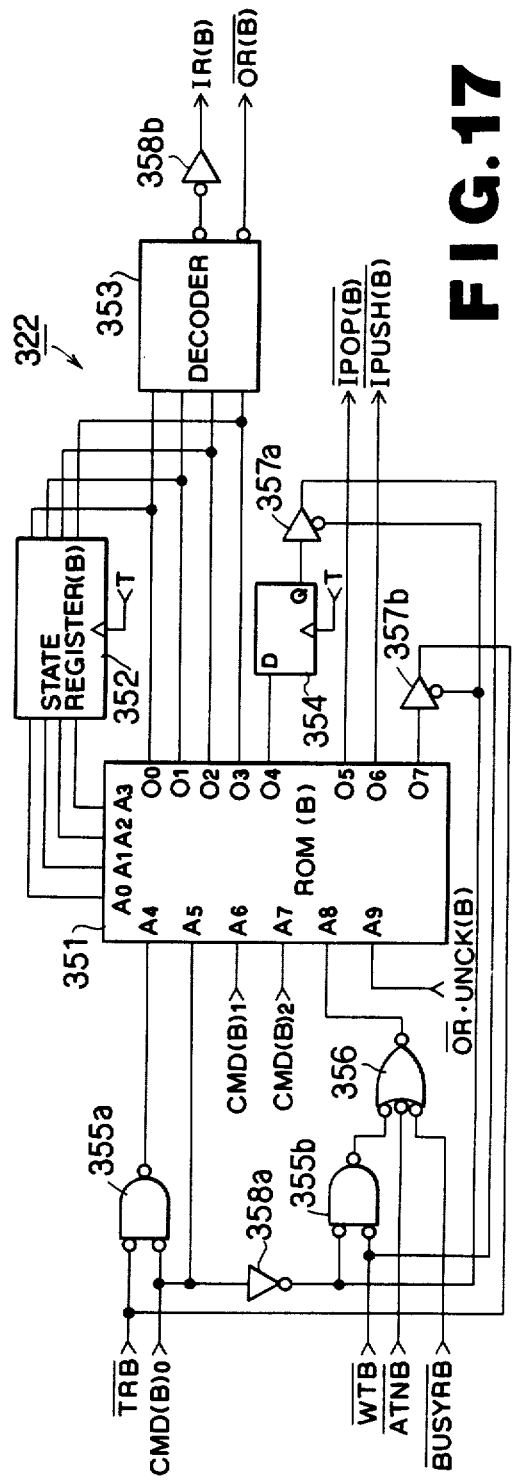
FIG. 17 is a constitution diagram of a PB port sequencer of the apparatus.

FIG. 17 is a diagram illustrating a constitution example of the PB port sequencer 322 of FIG. 13. In FIG. 17, numeral 351 designates a read only memory ROM (B), numeral 352 a state register (B), numeral 353 a decoder, numeral 354 D flip-flop, numerals 355a and 355b OR gates, numeral 356 AND gate, numeral 357a and 357b three-state buffers, and numerals 358a and 358b inverters. FIG. 17 has similar constitution to that of FIG. 16 except that signal $\overline{\text{BUSYR}}$ is received at the three-input AND gate 356.

The PI port sequencer 202, the PO port sequencer 222, the PA port sequencer 302, and the PB port sequencer 322 are all constituted on the basis of the ROM sequencer, and sequence of the port sequencers is controlled by the command registers 201, 221, 301, 321 and each input control signal. Function of the port sequencers will become clear in the following description of working.

In FIGS. 12 through 17, symbol T designates a clock signal, and symbol INIT an initializing signal. The initializing signal in the embodiment is transmitted from the microprogram control CPU 151. This constitution applies also to following figures.

Operation of the apparatus will now be described.

First, the handshaking data transfer as one basic operation of the PI 153, the PO 154, the PA 155, the PB 156 will be described. FIGS. 18a, 18b and 18c show command of the PI 153, the PO 154, the PA 155, the PB 156. When the PI 153 is used in the simple handshaking transfer, in order to set the PI 153 to "unconditional input" shown in FIG. 18a, the microprogram control CPU 151 makes CMD (I) = "1000" and transmits CMDLATCH (I). In this setting state, the PI port sequencer 202 receives data inputted from the PI data port 225 when $\overline{\text{TRR}}$ = "0" and the FIFO 203 is empty and ready, or otherwise it makes WTL = "1" and WTS = "0" and indicates to the port at transmission side that the receiving is impossible. If $\overline{\text{WTS}}$ = "0", the port at transmission side stops the transmission. Signal $\overline{\text{TR}}$ indicates whether the module is at the transfer period or not. Since the input latch 204 is inserted, the signal $\overline{\text{WTS}}$ is generated after receiving one word of the first data even if the FIFO 203 is not ready. Data may be transferred as long as the word number is not beyond the capacity of the FIFO 203. When the transfer period becomes "0" and $\overline{\text{WTS}}$ = "0", signal $\overline{\text{TRR}}$ acts so that the module does not receive data. If one data block is stored in the FIFO 203, output ready signal $\overline{\text{OR}}$/ of the PI port sequencer 202 becomes "0" and it is indicated that the FIFO 203 can be read out, thereby the microprogram control CPU 151 reads out the data block when IGATE (I) is "1". When one word is read, POP signal $\overline{\text{RD}}$/ = "0" and next data can be read out from the FIFO 203.

When the PO 154 is used in the simple handshaking transfer, two sorts of command being not DAISY shown in FIG. 18b may be used. In order to set the command to "FIFO write·$\overline{\text{DAISY}}$" for the writing of the FIFO 223, CMD(O) = "100" and CMDLATCH (O) is transmitted. Thereby the input ready signal $\overline{\text{IR}}$/ = "0" and it is indicated to the microprogram control CPU 151 that FIFO can be written. Thereby data is carried on the inner data bus (IDB 0-15) 160 and WR (O) is transmitted, and the writing in the prescribed word number is performed to the FIFO 223. In order to set the command to "output·$\overline{\text{DAISY}}$", if CMDLATCH (O) is transmitted at CMD(O) = "110", the PO port sequencer 222 makes $\overline{\text{OGATE}}$ "0" and the FIFO 223 outputable and generates signal $\overline{\text{TRS}}$ = "0" to indicate that the PO port is at output state. Thereby data is transmitted to the input port connected to the PO 154. The PO port sequencer 222 decides whether or not data remains in the FIFO 223 by the $\overline{\text{OR·UNCK}}$ (O) signal obtained from OR output and UNCK output of the FIFO 223. Signal $\overline{\text{OPOP}}$ = "0" is transmitted to the FIFO 223 until the data does not remain there, and then the new data word is transmitted. When setting is performed to $\overline{\text{WTR}}$ = "0" from the input port and input of the PO port sequencer 222 becomes WTO = "1", the transfer of data is stopped. If WTO = "1" before the transfer starting of the data block, generation of $\overline{\text{TRS}}$ = "0" is waited until WTO = "0".

The PA 155 and the PB 156 also may be used in the handshaking data transfer, and the operation is similar to the input/output operation of the PI 153 and the PO 154. However, the input operation is slightly different from the PI 153 in that the input latch 204 is not provided but the three-state buffer 304a or 304b is used.

Since there is not significant difference between the PA 155 and the PB 156, the handshaking data transfer of the PA 155 will be described.

At the input mode, in order that the microprogram control CPU 151 sets the command to "input", CMDLATCH (A) is transmitted at CMD(A) = "100" (refer to FIG. 18c). When data is transmitted from the output port connected to the PA 155, data is supplied to the PA data bus 324 and $\overline{\text{TRA}}$ = "1", thereby the three-state buffer 304a acts at the least significant bit CMD(A) being 0 of CMD(A) = "100". Consequently, data of the PA data bus 324 is written to the FIFO 303 by signal $\overline{\text{OPUSH}}$/ . The writing of the FIFO 203 is performed as long as signal $\overline{\text{TRA}}$ is "0". When the data block of some data word number has been written to the FIFO 203, signal $\overline{\text{WTA}}$ = "0" is transmitted from the PA port sequencer 302 and it is indicated that the PA 155 cannot receive the data input.

The microprogram control CPU 151 detects $\overline{\text{OR}}$/ being "0" to indicate that data of the FIFO 303 can be outputted to the microprogram control CPU 151, and the data of the FIFO 203 is read out on the inner data bus IDB 0-15 at $\overline{\text{IGATE}}$/ = "0". This is continued until the PA port sequencer 302 decides that data within the FIFO 303 is evacuated by the signal $\overline{\text{OR·UNCK}}$(A) obtained from OR output and UNCK output of the FIFO 303 and the signal $\overline{\text{OR}}$/ becomes "1".

On the other hand, at the output mode, in order that the microprogram control CPU 151 sets the command to "FIFO write", CMDLATCH(A) is transmitted at CMD(A) = "101". Since the least significant CMD(A)O of the CMD(A) is "1", the three-state buffers 304b, 304c act and the PA port sequencer 302 transmits signal IR(A) = "1" to the microprogram control CPU 151. Data is carried on the data bus IDBO-15 by the microprogram control CPU 151, and the writing is repeated to the prescribed word number on the FIFO 203 at $\overline{\text{WR}}$/ = "0". When the writing is finished, in order to set the command to "output", the microprogram control CPU 151 transmits CMDLATCH(A) at CMD(A) = "111". Thereby the PA port sequencer 302 starts the output operation at $\overline{\text{TRA}}$ = "0" unless $\overline{\text{WTA}}$ = "0". Signal $\overline{\text{IPOP}}$/ is transmitted and the output operation is performed until it is detected that the FIFO 203 becomes empty by the $\overline{\text{OR·UNCK}}$(A) signal produced by OR output and UNCK output of the FIFO 303. If WTA = "0", waiting is performed until $\overline{\text{WTA}}$ = "1", and then similar operation is performed. When $\overline{\text{WTA}}$ = "0" at the midway of the transfer, the transfer operation is stopped during the period of $\overline{\text{WTA}}$ = "0".

The handshaking data transfer has been described. In this embodiment, however, the daisy chain transfer performs the data transfer between modules at high speed in comparison to the prior art. The daisy chain data transfer will now be described.

Figure 20A:
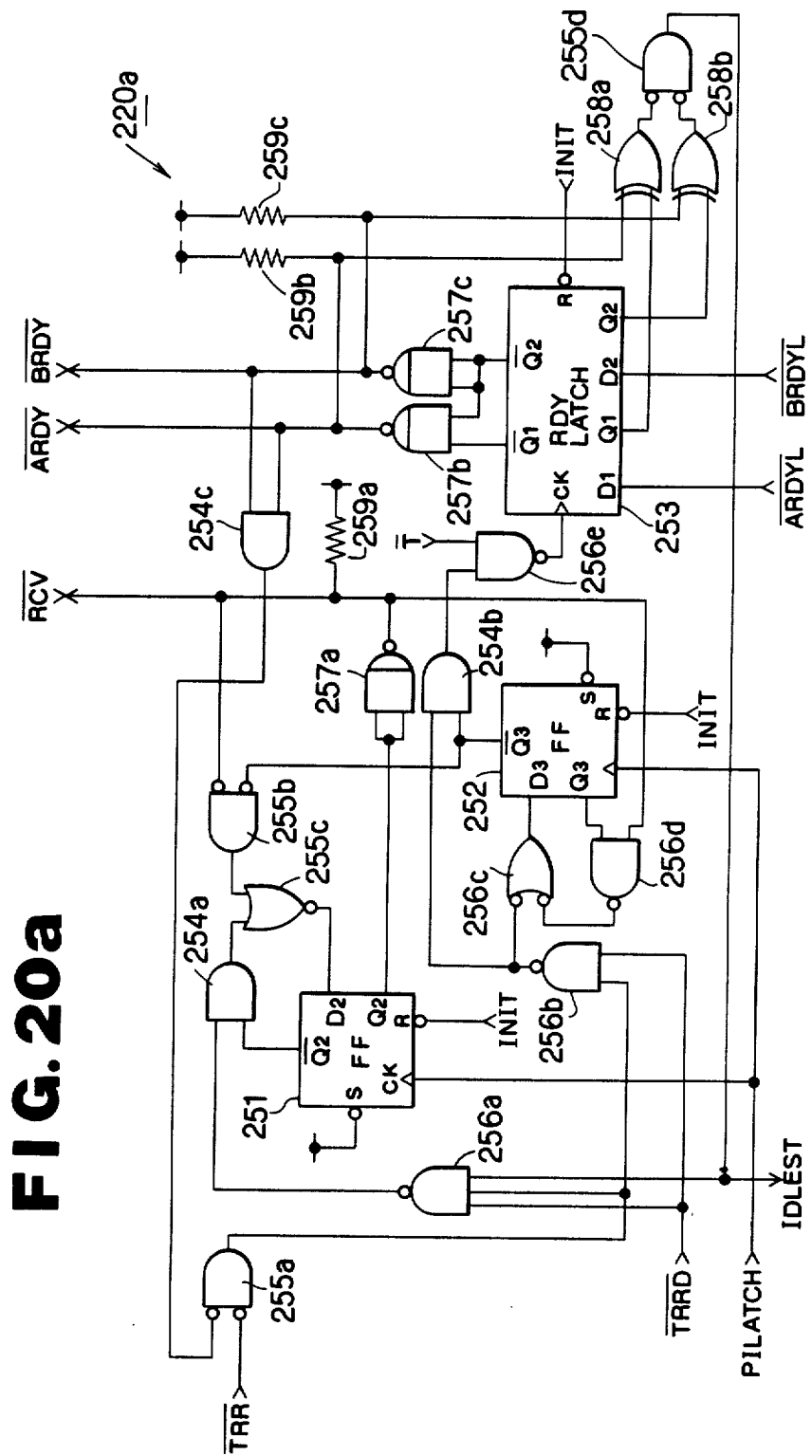
FIG. 20a is a diagram illustrating a load distribution control part of a daisy chain controller of the apparatus.

FIG. 19, FIG. 20a and FIG. 20b show an apparatus to be used in the daisy chain data transfer. FIG. 19 is a function block diagram of the comparator 219 of FIG. 12. In FIG. 19, numeral 231 designates a comparison data register, numeral 232 a mask data register, numeral 233 a comparator, numeral 234 a mask circuit, and numeral 235 a pull-up resistor. FIGS. 20a and 20b are a circuit block diagram of the daisy chain controller 220 of FIG. 12. FIG. 20a shows a load distribution control part 220a, and FIG. 20b shows an attention wait signal generating part 220b. In FIGS. 20a, and 20b, numerals 251, 252 designate flip-flops, numeral 253 a ready latch, numerals 254a, 254b and 254c AND gates, numerals 255a, 255b and 255c NOR gates, numerals 256a, 256b, 256c, 256d and 256e NAND gates, numerals 257a, 257b, 257c and 257d open collector NAND gates, numerals 258a and 258b YEAR gates, numerals 259a, 259b and 259c pull-up resistors, numeral 261 an attention number register, numeral 262 a down-counter, numerals 263a and 263b flip-flop, numeral 264 an open collector inverter buffer, numerals 265a, 265b, 265c and 265d, numeral 266 NOR gate, numeral 267 OR gate, numerals 268a and 268b inverters, numeral 269 ENOR gate, and numeral 270 a pull-up resistor.

Further description of FIG. 19, FIG. 20a, and FIG. 20b shall be performed in the following description regarding the daisy chain operation.

First, the daisy chain to perform the selective data transfer will be described. In this case, prescribed data or data block is transferred to a predetermined module 150. This may be used as one means of data distribution in a data driven computer.

Figure 21:
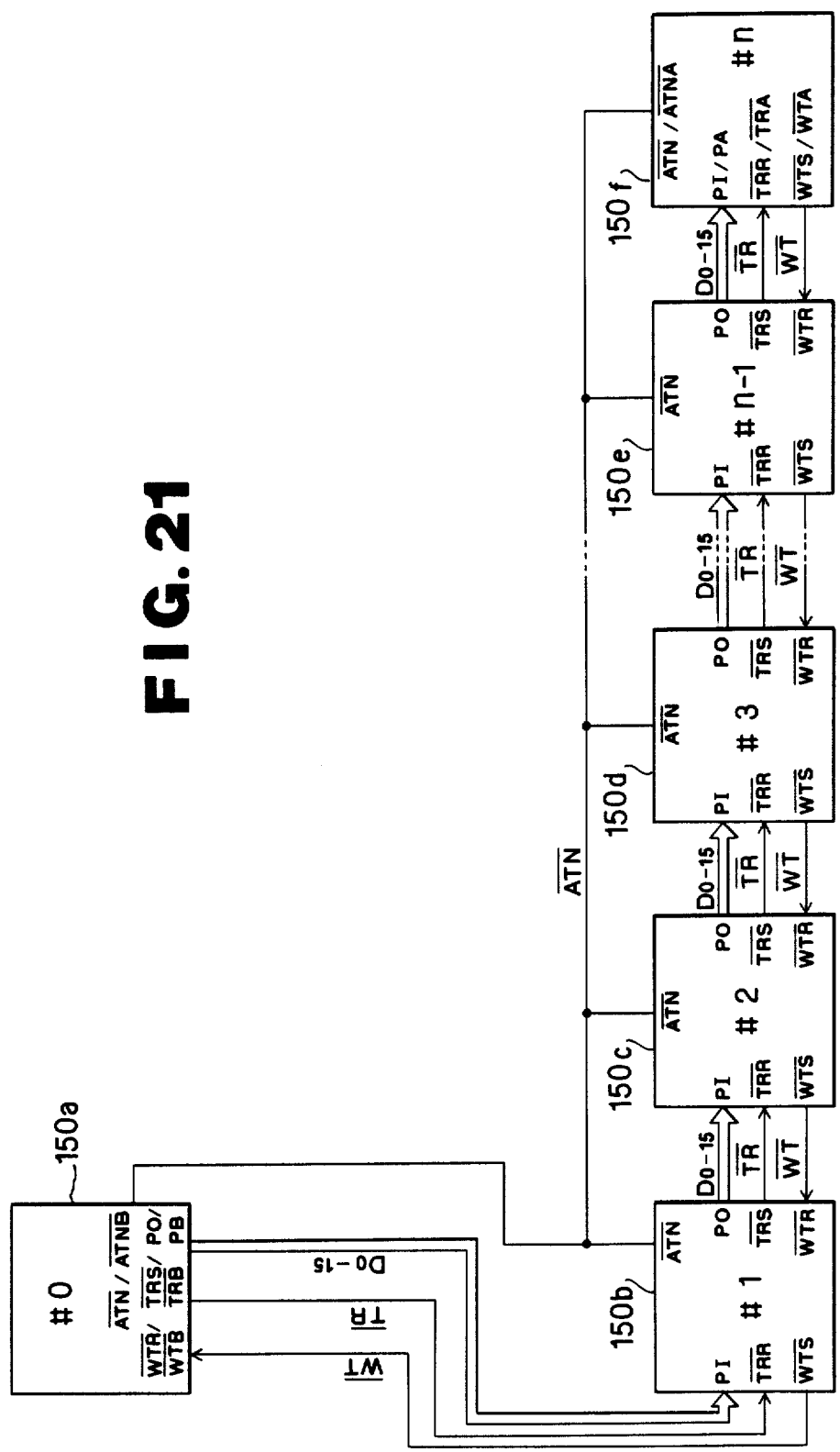
FIG. 21 is a diagram illustrating signal connection of daisy chain for the selective data transfer.

FIG. 21 is a diagram illustrating signal connection of the daisy chain in the selective data transfer. In FIG. 21, numerals 150a–150f designate modules #0 - #n. The module #0 uses the PO 154 set to "FIFO write $\overline{\text{DAISY}}$" or "output $\overline{\text{DAISY}}$" in FIG. 18b or the PB 156 set to "FIFO write" or "output" in FIG. 18c. The module #n uses the PI 153 set to "unconditional input" in FIG. 18a or the PA 155 set to "input" in FIG. 18c. The module #1, the module #2, ..., the module #n−1 use the PI 153 set to "selective input/bypass" in FIG. 18a and the PO 154 set to "initialization" in FIG. 18b respectively. In this setting state the module #0 becomes output module, and the modules #1 - #n become input modules.

The port data bus D 0-15 between module 150a and module 150b, between module 150b and module 150c, between module 150c and module 150d, or the like is connected with the transfer signal $\overline{\text{TR}}$, the wait command signal $\overline{\text{WT}}$ between ports, and the attention signal $\overline{\text{ATN}}$ is connected in wired OR constitution to all modules directly. When the $\overline{\text{WT}}$ signal is generated or disappears in some module, the attention signal $\overline{\text{ATN}}$ temporarily stops the data transfer throughout the data transfer system until the $\overline{\text{WT}}$ signal is propagated to all modules even if the data transfer system is long.

Transferred data is usually a data block longer than one word, and in the daisy chain to perform the selective data transfer, 16 bits of the first word are used partly or wholly thereby the coincidence comparison is performed.

Data is written from the module #0 to the FIFO 223 in similar manner to output of the handshaking data transfer. If the FIFO 203 of the PI 153 from the module #1 to the module #n is empty, condition $\overline{\text{WT}}$="0" is not satisfied and therefore output of the module #0 is directly inputted to the PI data port 225 of the module #1. This data is supplied at the module #0 with address value predetermined to the first word, i.e. that of the module to be transferred. Regarding the module #1 to the module #n−1, the comparison data and the mask data are stored in the comparison data register 231 and the mask data register 232 respectively of each module shown in FIG. 19 from the microprogram control CPU 151 through the inner data bus IDB 0-15 by means of signals LCMP, LMSK. At the first clock when the PI data arrives and $\overline{\text{TR}}$="0", the PI data and the comparison data stored in the comparison data register 231 are compared by the comparator 233. Unrequired bit is masked by the mask data of the mask data register 232 in the mask circuit 34, and then the coincidence signal MC is obtained. According to the coincidence signal MC, decision of coincidence or not is effected at the PI port sequencer 202, thereby the data block entered in the PI data port 225 is inputted in the module or otherwise it is bypassed.

As above described, the data block transmitted from the module #0 is outputted at determining the module 150 to receive the first word of the data block, and particularly if the first word is set without determining the module 150 to receive it, the data block is transmitted to the last module #n.

If the data block from the module #0 is received by the module #3 and subsequently the data block is transmitted to the module #3 and the FIFO 203 of the module #n−1 is not yet empty, the first word is latched to the input latch 204 of the module #3 and at the same time WTL="1" and at next clock cycle WTLD="1", and $\overline{\text{WTS}}$="0" through the NOR gate 266 in the attention wait signal generating part 220b shown in FIG. 20b, thereby the wait command signal $\overline{\text{WT}}$ of the module #3 becomes "0". In the module #2 receiving this signal, the signal $\overline{\text{WTR}}$ of the attention wait generating part 220b becomes "0". Then since the command register (I) 201 of the PI 153 of the module #2 is set to CMD (I)="1101" as "selective input/bypass", DAISY="1" by the OR gate 209a of the PI 153. Since the $\overline{\text{BU}}$ $\overline{\text{SYR}}$="1", output of the NAND gate 265d becomes "0" and output signal WTI of the NAND gate 265b becomes "1".

The signal $\overline{\text{WTS}}$ receiving the output of the NAND gate 265d becomes "0" at the signal path of the inverter 268a and NOR gate 266. Output of the ENOR gate 269 becomes "0", and value corresponding to the attention number previously stored in the attention register 261 from the microprogram control CPU 151 through the inner data bus IDB 0-3 by means of the signal ATNO.-LATCH is preset to the down-counter 262, and also the flip-flop 263a is set and $\overline{\text{ATN}}$="0". And then the BORROW output is transmitted from the down-counter 262 and entered in the clock input of the flip-flop 263a, and condition $\overline{\text{ATN}}$="0" is continued until the Q output of the flip-flop becomes "0".

The flip-flop 263b and the ENOR gate 269 detect variation of the inputted wait command signal, and if there is any variation of the signal the output of the ENOR gate 269 becomes "0".

The attention signal $\overline{\text{ATN}}$ is used for the following purpose. In order to propagate the wait command signal $\overline{\text{WT}}$ in the plural modules 150, the signal must pass through the inverters 268a, 268b, the NAND gate 265d and the NOR gate 266, each corresponding to the modules in number. That is, since the gate propagation delay time cannot be ignored in comparison to the clock period, the attention signal $\overline{ATN}$ is used to stop the data transfer temporarily during the propagation delay time.

Next, the daisy chain to perform the load distribution data transfer will be described. In this case, prescribed data or data block is transferred to the modules 150 having the same processing function. This may be used as one means of data distribution.

Figure 22:
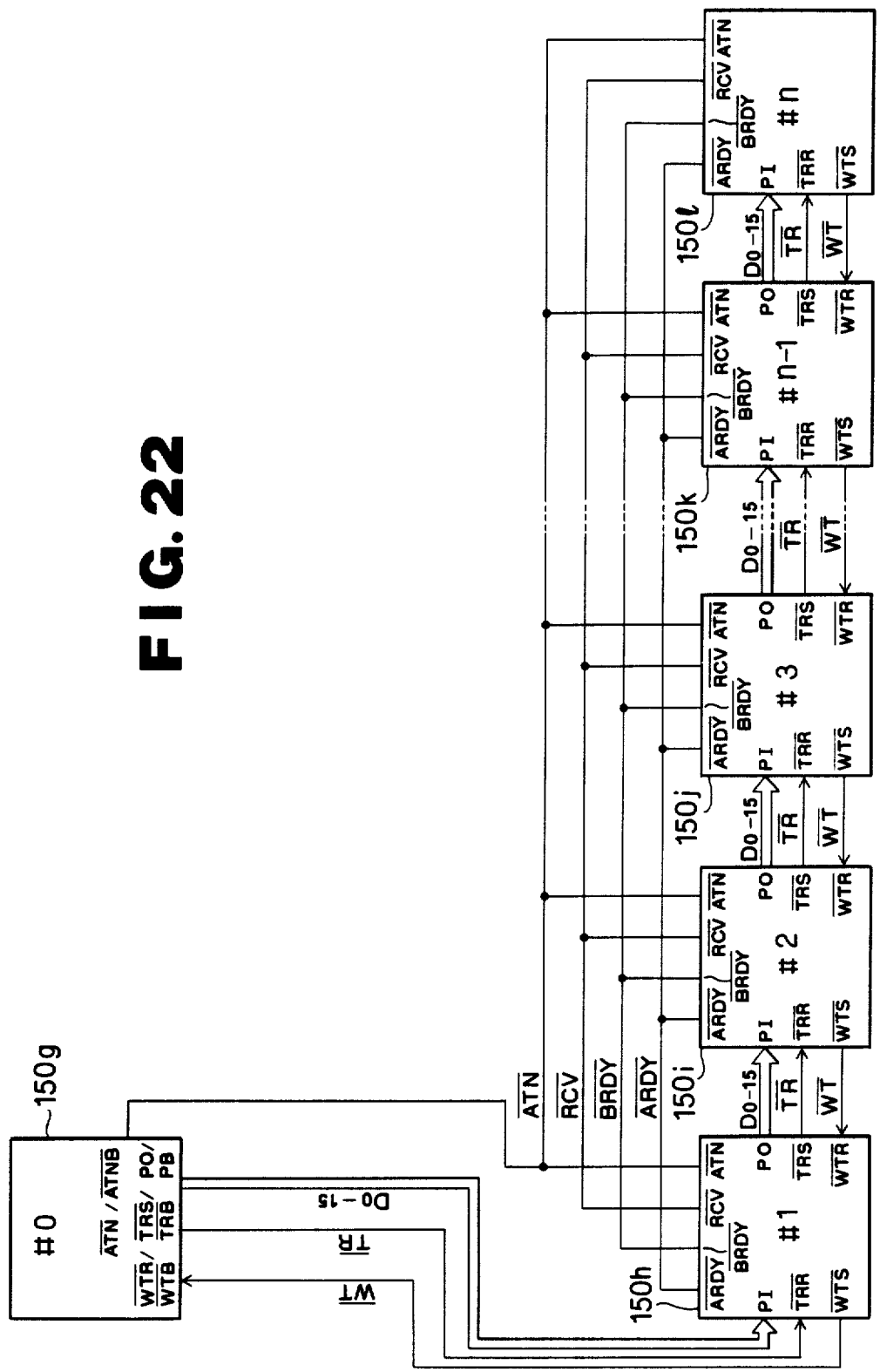
FIG. 22 is a diagram illustrating signal connection of daisy chain for the load distribution data transfer.

FIG. 22 is a diagram illustrating signal connection of the daisy chain in the load distribution data transfer. In FIG. 22, numerals 150g–150l designate modules #0–#n. The module #0 uses the PO 154 set to "FIFO write·$\overline{DAISY}$" or "output·$\overline{DAISY}$" in FIG. 18b or the PB 156 set to "FIFO write" or "output" in FIG. 18c. The module #n uses the PI 153 set to "unconditional input" in FIG. 18a. The module #1, the module #2, . . . , the module #n−1 use the PI 153 set to "load distribution input/bypass·$\overline{ARDY}$" in FIG. 18a if operation unit contained in the microprogram control CPU 151 is not ready or to "load distribution input/bypass.ARDY" if it is ready and the PO 154 set to "initialization" in FIG. 18b respectively. In this setting state, the module #0 becomes output module, and other modules 150h–150l become input modules.

The port data bus D 0-15 between module 150g and module 150h, between module 150h and module 150i, between module 150i and module 150j, or the like is connected with the transfer $\overline{TR}$, the wait command signal $\overline{WT}$ between ports. Other ALU ready signal $\overline{ARDY}$, BUFFER ready signal $\overline{BRDY}$ representing the FIFO 203 being ready (empty), and receiving signal $\overline{RCV}$ generated at receiving the data in some module, are all connected in wired OR constitution to all modules directly in similar manner to the attention signal $\overline{ATN}$ already described.

Regarding output from the module #0, prescribed data is written to the FIFO 223 and then outputted as already described in the daisy chain of the selective data transfer. At first, any FIFO 203 of the module #1, the module #2, . . . , the module #n is empty and the ALU is ready, thereby both $\overline{ARDY}$ and $\overline{BRDY}$ are "0". In the load distribution control part 220a of FIG. 20a, the RDY latch 253, the flip-flops 251, 252 are initialized by the initializing signal INIT, and input from the PI port sequencer 202 and signals $\overline{ARDYL}$, $\overline{BRDYL}$ are always latched to the RDY latch 253. If state is coincident between $\overline{ARDY}$, $\overline{BRDY}$ and the RDY latch 253, the module 150 is the most slack and the signal IDLEST indicating the most slack module becomes "1". If a data block is propagated from the module #0 and $\overline{TRR}$="0", since IDLEST="1", the PI port sequencer 202 acts to take the data block into its own FIFO 203.

The RDY latch 253 stops the latch action if the data block arrives to the PI data port 225, and leaves the state unchanged. When any of the PI 153 of the modules 150 to constitute the daisy chain determines the receiving, the RDY latch 253 generates signal to make $\overline{RCV}$="0" and performs the latch action again. When the data block is transferred in the modules, even if the module 150 receiving the front end of the data block passing acts to change the signals $\overline{ARDY}$, $\overline{BRDY}$, data cannot be received at the returned state to the module 150. Consequently, the RDY latch 253 acts to allow changing of $\overline{ARDY}$, $\overline{BRDY}$ in only the module 150 to which the data block is not yet transferred. When any of the modules 150 receives the data block and $\overline{RCV}$="0", the changing of $\overline{ARDY}$, $\overline{BRDY}$ in all modules is allowed again.

The data block may be taken when IDLEST="1" in the module 150. It is of course allowed also when $\overline{AR}$ $\overline{DYL}$="1", BRDYL="0". However, when the data block is transferred at $\overline{ARDY}$=$\overline{BRDY}$="1", even if IDLEST="1", $\overline{BRDYL}$="1" and the FIFO 203 is not ready, thereby the data block cannot be received. In this case, the data block is transferred to any module among the succeeding modules 150 whose $\overline{BRDY}$ becomes "0".

The load distribution control part 220a shown in FIG. 20a only allows one data block to exist on the daisy chain. If a plurality of data blocks exist on the daisy chain, the normal operation is not performed. Consequently, length of the daisy chain must be set so that only one data block exists on the daisy chain. In this embodiment, since the data block is constituted by 16 words, length of the daisy chain allows connection of the 32 modules in the doubled number or more in consideration of the write clock number of the FIFO 223. This is sufficient for the practice.

Operation of the daisy chain in the load distribution data transfer is as above described. When IDLEST="1", the data block is transferred to the module 150 in condition $\overline{BRDYL}$="0" disposed most close to the module 150g. The $\overline{ARDYL}$ signal is changed by the command corresponding to state of ALU in the microprogram control CPU 151 as shown in FIG. 18a, output CMD (I) 0-3 of the command register (I) 201 is received at the NAND gate 284, and the signal is generated at the latch action of the flip-flop 283.

Further, the daisy chain will be described where data or data block once distributed is collected from the modules 150.

Figure 23:
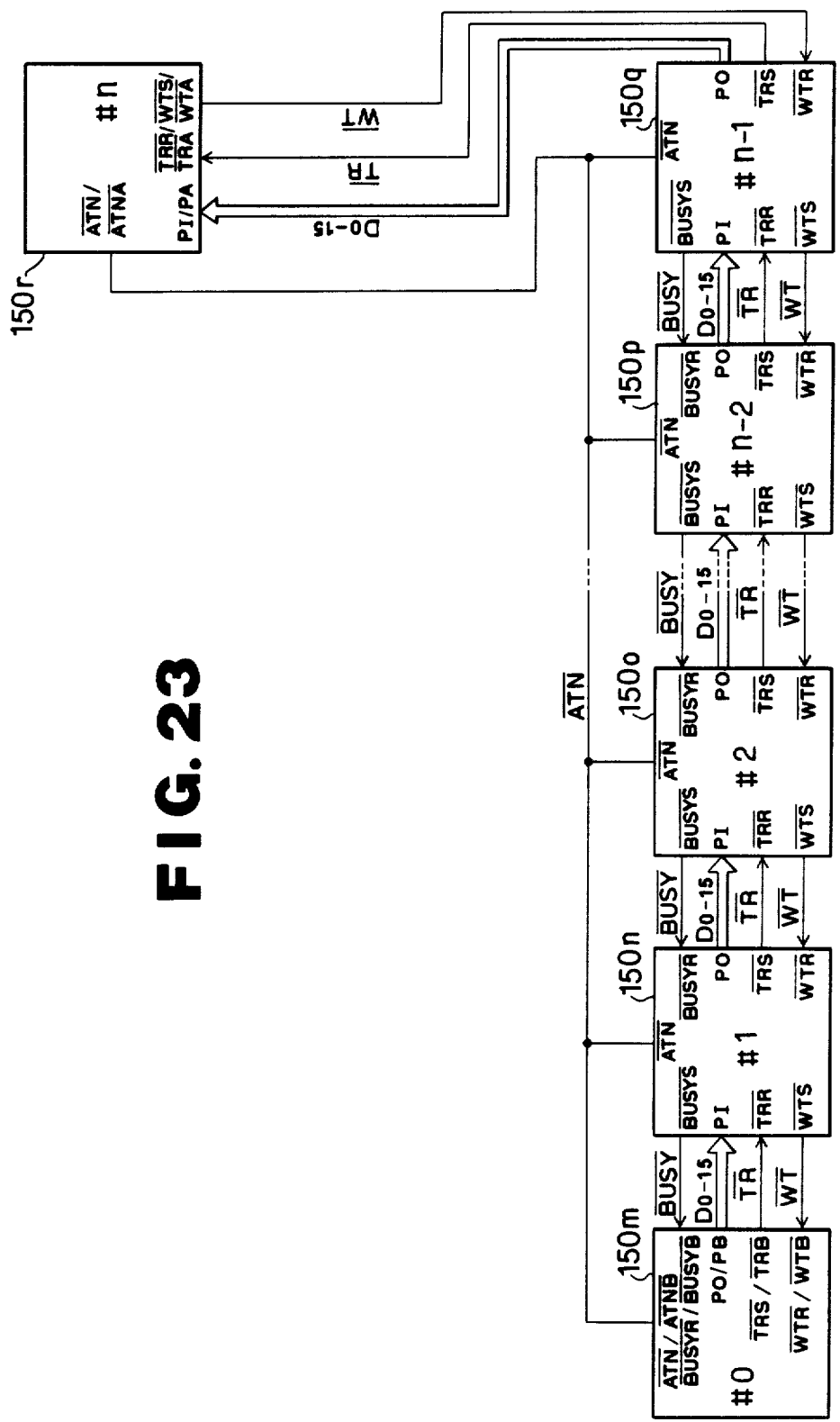
FIG. 23 is a diagram illustrating signal connection of daisy chain for the collection data transfer.

FIG. 23 is a diagram illustrating signal connection of the daisy chain for the collective data transfer. In FIG. 23, numerals 150m–150r designate modules #0–#n. The module #0 uses the PO 154 set to "FIFO write ·$\overline{DAISY}$" or "output·$\overline{DAISY}$" in FIG. 18b or the PB 156 set to "FIFO write" or "output" in FIG. 18c. The module #n uses the PI 153 set to "Unconditional input" in FIG. 18a or the PA 155 set to "input" in FIG. 18c. The module #1, the module #2, . . . , the module #n−1 use the PI 153 set to "unconditional bypass" in FIG. 18a and the PO 154 set to "FIFO write.DAISY" or "output·DAISY" in FIG. 18b respectively. In this setting state, the modules #0 - #n−1 become output modules, and the module #n becomes input module.

The port data bus D 0-15 between module 150m and module 150n, between module 150n and module 150o, between module 150o and module 150p, or the like is connected with the transfer signal $\overline{TR}$, the wait command signal $\overline{WT}$ and the signal $\overline{BUSY}$ indicating the PO 154 at output state between ports. The $\overline{ATN}$ signal is similar to that described in FIG. 21 and FIG. 22.

Output of the module #0 is as already described in the selective daisy chain and the load distribution daisy chain. This case is different in that the $\overline{BUSY}$ signal is received by $\overline{BUSYR}$ in the PO 154 and by $\overline{BUSYRB}$ in the PB 156, and in order to prevent these output ports from entering in the output action, the PO port sequencer 222 or the PB port sequencer 322 is set in the sequence.

At the output action of the module #1, for example, the PO port sequencer 222 receives the signals $\overline{TRR}$ and $\overline{TRRD}$ as input at the AND gate 293, and confirms that there is no data block in the PO data port 226 and further confirms that the $\overline{BUSY}$ input from the module #2, i.e. the signal $\overline{BUSYR}$ is not "0". And then the PO port sequencer outputs the signal $\overline{\text{BUSYSL}}$, and transmits the signal $\overline{\text{BUSYS}}$ through the D flip-flop 205c.

Operation of output module in any of the modules #1 through #n−1 is similar to the above description.

If the module #2 performs output action, the $\overline{\text{BUSY}}$ signal thereof becomes "0" and the signal BUSYR of the module #1 becomes "0", and the wait command signal WTO of the PO port sequencer 222 as shown in the attention wait generating part 220b becomes "1" through the NAND gate 265c and the output is stopped. If the signal $\overline{\text{WT}}$="0" is generated from the module #n during the output action of the module #2 and the signal $\overline{\text{WTR}}$="0" is entered in the NAND gate 265d through the inverter 268b, since CMD (I)="101X", output DAISY of the OR gate 109a is "1" and output of the NAND gate 265d becomes "0" at the modules #n−1, #n−2, ..., #2 and output $\overline{\text{WTS}}$ becomes "0". However, the module #1 receives $\overline{\text{BUSYR}}$="0" as input from the module #2, thereby $\overline{\text{WTS}}$="1" and the wait command is eliminated between the module at output state of the PO 154 and the upper module. Consequently, when the output action is performed at the upper module, data block is transferred to the input latch 204 of the PI 153 in the module outputting at the midway, thereby the data can be transferred at the higher speed.

Above-mentioned daisy chain may be used in combination. Since data or data block collected in the daisy chain of the collective data transfer shown in FIG. 23 is obtained in output of the module #n−1, the output of the module #n−1 is used in place of the module #0 of FIG. 21, thereby the daisy chain of the collective data transfer and the daisy chain of the selective data transfer can be constituted so as to perform the collection and the selective data distribution efficiently. In similar manner, use in the daisy chain of the load distribution data transfer shown in FIG. 22 enables the collective and load distribution data transfer efficiently.

According to the apparatus of the invention, since required transfer function sequence setting is performed to the port sequencer of the input/output port and the daisy chain transfer is performed, when data are distributed first to a module of light load among a plurality of data processing modules or output data from a plurality of data processing modules are collected in a single data processing module, it is not necessary to perform the address setting at each transfer action thereby the data transfer between the required data processing module and other data processing module can be performed simply at high speed. Furthermore, since the selective data distribution by address can be performed, the apparatus can be used as a data transmission apparatus of a data driven computer so as to realize the high speed operation.

In the above description, the upside lateral bar of $\overline{\text{ATN}}$ for example means the negative logic, i.e. it is active when the signal is low.

Although the data transmission apparatus for the data driven computer has been described in the embodiment, the apparatus of the invention of course may be applied to anything as long as it performs the data transfer between processing modules.

According to the data transmission apparatus of the invention as above described, since each of plural data processing modules to constitute the apparatus is provided with input/output ports, a port sequence to control operation of the ports, and a daisy chain controller and a required transfer function sequence can be set to the port sequencer, the load distribution data transfer and the collective data transfer between plural data processing modules without the address setting can be performed simply at high speed. Furthermore, since the selective data distribution can be performed, the apparatus can be used in a data driven computer so as to realize the high-speed operation.

What is claimed is:

1. An information processing module, comprising:
   a parallel input port and a parallel output port;
   a parallel port control unit having means for performing control including direct data transfer between said parallel ports;
   a serial input port and a serial output port;
   a serial port control unit having means for performing control including direct data transfer between said serial ports;
   first and second rewritable memory units for storing a first program inputted through any of said input ports and a second program including an instruction code to control the execution of the first program, respectively;
   a third memory unit for performing buffer storing of data inputted through any of the input ports;
   an operation unit for processing data inputted through any of the input ports or stored data in said third memory unit;
   a central control unit responsive to the instruction code in the second program for controlling said port control units, said memory units and said second operation unit by means of said first program in accordance with signals representing states of said parallel port control unit, said serial port control unit and said operation unit; and
   a common bus interconnecting the parallel ports, the serial ports, the memory units, the operation unit and the central control unit;
   wherein said module is connected in a cascade arrangement with a plurality of modules wherein each of said plurality of modules is said information processing module by corresponding ports of said parallel and serial ports of said input and output ports so that processing by said operation unit of data in said third memory is concurrent with direct data transfer between the corresponding input and output ports of data passing in the cascade arrangement.

2. An information processing module as set forth in claim 1, wherein said central control unit comprises a microprogram data processing system including said first memory unit, so that the central control unit in itself controls the operation unit, the second memory unit, the parallel port control unit and the serial port control unit by means of a micro instruction of horizontal type.

3. An information processing module as et forth in claim 1, wherein said second and third memory units are provided with an address register/counter and can execute the data read write continuously at self support using an address increment, and read data can be set as address to be accessed to the address register/counter thereby the indirect address assignment can be effected at multiple stages and at self support.

4. An information processing module, comprising:
   a parallel input port and a parallel output port;
   a data transfer line to connect said parallel ports directly;

an input register to perform buffering of data inputted through the parallel input port;

a parallel port control unit having means for performing control between said parallel ports including direct data transfer by said data transfer line and data writing to said input register;

a serial input port and a serial output port;

a serial port control unit having means for performing control of said serial ports including data transfer between said serial ports;

first and second rewritable memory units for storing a first program inputted through any of said input ports and a second program including an instruction code to control the execution of the first program, respectively;

a third memory unit for performing buffer storing of data inputted through any of the input ports;

an operation unit for processing data inputted through any of the input ports or stored data in said third memory unit;

a central control unit responsive to the instruction code in the second program for controlling said port control units, said memory units and said operation unit by means of said first program in accordance with signals representing states of said parallel port control unit, said serial port control unit and said operation unit; and a common bus interconnecting the parallel ports, the serial ports, the memory units, the operation unit and the central control unit;

wherein said module has its parallel ports interconnected with a plurality of other modules wherein each of said plurality of other modules is said information processing module in a daisy chain arrangement so as to perform daisy chain transfer, and said parallel port control unit includes means for performing control to perform said direct data transfer of data passing in the daisy chain arrangement by said data transfer line or to refuse the receiving o the transferred data or to store it in the input register or to transfer it to the third memory in accordance with a state of said operation unit or said input register.

5. An information processing module as set forth in claim 4, wherein said transferred data in daisy chain is a block data of plural words.

6. An information processing module as set forth in claim 4, wherein said parallel input port and said parallel output port are capable of handshake data transfer to another information processing module.

7. An information processing module, comprising:

a parallel input port and a parallel output port;

a data transfer line to connect said parallel ports directly;

an input register to perform buffering of data inputted through the parallel input port;

a parallel port control unit having means for performing control between said parallel ports including direct data transfer by said data transfer line and data writing to said input register;

a serial input port and a serial output port;

a serial port control unit having means for performing control of said serial ports including data transfer between said serial ports;

first and second rewritable memory units for storing a first program inputted through any of said input ports and a second program: including an instruction code to control the execution of the first program, respectively;

a third memory unit for performing buffer storing of data inputted through any of the input ports;

an operation unit for processing data inputted through any of the input ports or stored data in said third memory unit;

a central control unit responsive to the instruction code in the second program for controlling said port control units, said memory units and said operation unit by means of said first program in accordance with signals representing states of said parallel port control unit, said serial port control unit and said operation unit; and a common bus interconnecting the parallel ports, the serial ports, the memory units, the operation unit and the central control unit;

wherein said module has its parallel ports interconnected with a plurality of other modules wherein each of said plurality other modules is said information processing module in a daisy chain arrangement, and said parallel port control unit is provided with means for discriminating a code assigning a destination of the data inputted to the parallel input port, such that if the data is not assigned to said information processing module, the data is transmitted through said data transfer line and the parallel output port to another information processing module so as to perform daisy chain transfer concurrent with processing of data in said third memory unit by said operation unit.

8. An information processing module, comprising:

a parallel input port and a parallel output port;

a parallel port control unit having means for performing control between said parallel ports including data transfer;

a serial input port and a serial output port;

a data transfer line to connect said serial ports directly;

a serial port control unit having means for performing control of said serial ports including direct data transfer between said serial ports by said data transfer line;

first and second rewritable memory units capable of being rewritten for storing a first program inputted through any of said input ports and a second program including an instruction code to control the execution of the first program, respectively;

a third memory unit for performing buffering of data inputted through any of the input ports;

an operation unit for processing data inputted through any of the input ports or stored data in said third memory unit;

a central control unit responsive to the instruction code in the second program for controlling said port control units, said memory units and said operation unit by means of said first program in accordance with signals representing states of said parallel port control unit, said serial port control unit and said operation unit; and a common bus interconnecting the parallel ports, the serial ports, the memory units, the operation unit and the central control unit;

wherein said module has its serial ports interconnected with a plurality of other modules wherein each of said plurality of other modules is said information processing module in a daisy chain arrangement so that daisy chain transfer of data passing in the daisy chain arrangement can be performed concurrent with processing of data in said third memory unit by said operation unit, and said serial port control unit has means for supplying an interrupt command supplied to the serial input port to the central control unit to start interrupt processing, and for transferring the interrupt command through said data transfer line and the serial output port to the next information processing module connected thereto.

9. An information processing module, comprising:

a parallel input port and a parallel output port;

a parallel port control unit having means for performing control of said parallel input and output ports including direct data transfer between said parallel input and output ports;

a parallel bidirectional input/output port;

a combination of an input/output register to perform buffer storing of data inputted to or outputted from said input/output port, and an input/output port control unit to control the input/output port;

a serial input port and a serial output port;

a serial port control unit having means for performing control of said serial ports including direct data transfer between said serial ports;

first and second rewritable memory units for storing a first program inputted through any of said ports and a second program including an instruction code to control the execution of the first program, respectively;

a third memory unit for performing buffering of data inputted through any of the input ports;

an operation unit for processing data inputted through any of the input ports or stored data in said third memory unit;

a central control unit responsive to the instruction code in the second program for controlling said port control units, said memory units and said operation unit by means of said first program in accordance with signals representing states of said parallel port control unit, said serial port control unit and said operation unit; and a common bus interconnecting the parallel ports, the serial ports, the memory units, the operation unit and the central control unit;

wherein said module is connected in a cascade arrangement with a plurality of modules wherein each of said plurality of modules is said information processing module by corresponding ports of said parallel and serial ports of said input and output ports so that processing of data in said third memory unit by said operating unit is concurrent with direct data transfer between the corresponding input and output ports of data passing in the cascade arrangement, and said input/output port can transfer block data by handshaking to another information processing module.

* * * * *

UNITED STATES PATENT AND TRADEMARK OFFICE
CERTIFICATE OF CORRECTION

PATENT NO. : 4,833,605

DATED : May 23, 1989

INVENTOR(S) : Hiroaki Terada et al.

It is certified that error appears in the above-identified patent and that said Letters Patent is hereby corrected as shown below:

Column 6, line 38, delete the word "to".

Column 18, line 50, "I" should be --1--;

line 57, "et" should be --set--.

Signed and Sealed this

Twenty-seventh Day of November, 1990

Attest:

HARRY F. MANBECK, JR.

*Attesting Officer*   *Commissioner of Patents and Trademarks*